United States Patent
Hammer et al.

(10) Patent No.: US 12,548,425 B2
(45) Date of Patent: Feb. 10, 2026

(54) SYSTEM AND PROCESS FOR REMOTELY MONITORING A WORKPLACE

(71) Applicant: Dräger Safety AG & Co. KGaA, Lübeck (DE)

(72) Inventors: Thielo Hammer, Lübeck (DE); Simon Helbig, Lübeck (DE); Jürgen Langer, Lübeck (DE); Michael Kreilmeier, Lübeck (DE); Georg Piewald, Lübeck (DE); Mohamed Ibrahim, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 199 days.

(21) Appl. No.: 18/359,947

(22) Filed: Jul. 27, 2023

(65) Prior Publication Data
US 2024/0105045 A1     Mar. 28, 2024

(30) Foreign Application Priority Data
Sep. 23, 2022   (DE) ............... 10 2022 124 505.5

(51) Int. Cl.
  *G08B 21/14*   (2006.01)
  *G06V 20/52*   (2022.01)

(52) U.S. Cl.
  CPC .......... *G08B 21/14* (2013.01); *G06V 20/52* (2022.01)

(58) Field of Classification Search
  CPC ............... G08B 21/14; G06V 20/52
  See application file for complete search history.

(56) References Cited

U.S. PATENT DOCUMENTS

| | | | |
|---|---|---|---|
| 5,382,943 A | 1/1995 | Tanaka | |
| 8,988,232 B1* | 3/2015 | Sloo | G01J 1/4204 340/602 |
| 2002/0147982 A1 | 10/2002 | Naidoo et al. | |
| 2004/0233983 A1* | 11/2004 | Crawford | G08B 25/085 348/E7.086 |
| 2005/0174229 A1 | 8/2005 | Feldkamp et al. | |
| 2007/0285222 A1* | 12/2007 | Zadnikar | G01N 33/0075 340/509 |

(Continued)

FOREIGN PATENT DOCUMENTS

| | | | | |
|---|---|---|---|---|
| EP | 3594914 A1 * | 1/2020 | ......... | G01N 33/0075 |
| KR | 20200139976 A * | 12/2020 | ............ | G08B 25/10 |

*Primary Examiner* — Curtis A Kuntz
*Assistant Examiner* — James E Munion
(74) *Attorney, Agent, or Firm* — McGlew and Tuttle, P.C.

(57) ABSTRACT

A system and a process enable a workplace (A.1, A.2) to be monitored remotely. A monitoring unit for the workplace includes a camera (2.1, 2.2, 2.3), a gas measuring device (1.1, 1.2, 1.3, 1.4) and a workplace computer (3.1, 3.2). A communication unit (10) communicates with a control center with a central output computer and an output unit. Signals from the camera and the gas measuring device are transmitted by cable or wirelessly to the workplace computer and from there further transmitted by cable or wirelessly to the communication unit. The signals are transmitted wirelessly from the communication unit to the central output computer. The central output computer causes the received signals to be output on the output unit in a form that can be perceived by a human. The data connection between the communication unit and the central output computer may be routed via a public mobile radio network.

26 Claims, 7 Drawing Sheets

(56) References Cited

U.S. PATENT DOCUMENTS

| | | |
|---|---|---|
| 2016/0248989 A1* | 8/2016 | Cross ................. H04N 21/2385 |
| 2017/0351923 A1 | 12/2017 | Rice, II et al. |
| 2018/0330595 A1 | 11/2018 | Levine |
| 2021/0012638 A1* | 1/2021 | Jalilian ................. G08B 21/20 |

* cited by examiner

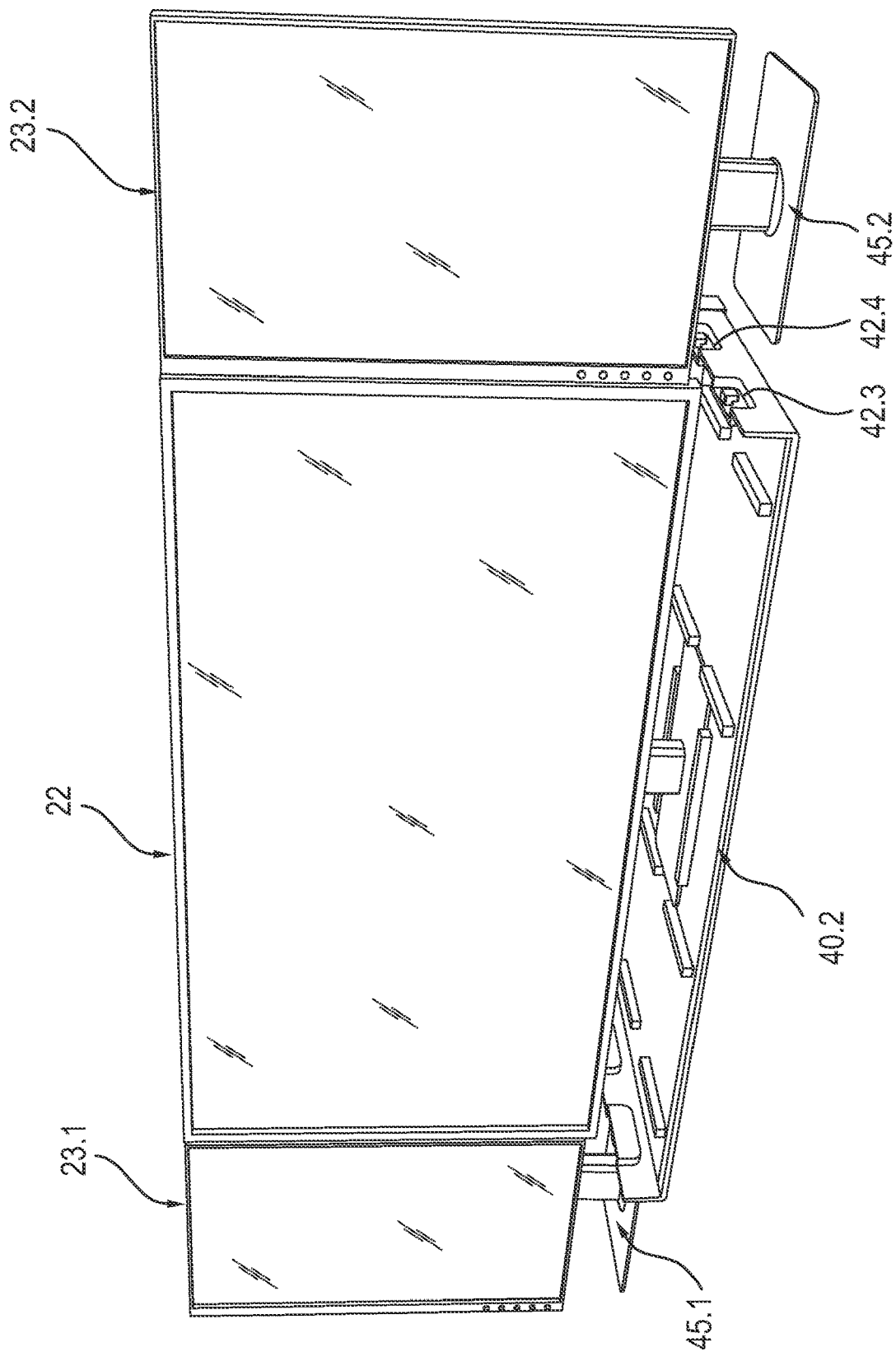

SYSTEM AND PROCESS FOR REMOTELY MONITORING A WORKPLACE

CROSS REFERENCE TO RELATED APPLICATIONS

This application claims the benefit of priority under 35 U.S.C. § 119 of German Application 10 2022 124 505.5, filed Sep. 23, 2022, the entire contents of which are incorporated herein by reference.

TECHNICAL FIELD AND BACKGROUND

The invention relates to a monitoring system and a monitoring process for remotely monitoring at least one workplace, during a period when at least one human is at least temporarily performing work at the workplace. Harmful gases may escape and other events hazardous to humans may occur at the workplace.

SUMMARY

It is an object of the invention to provide a monitoring system and a monitoring process which make it possible to monitor at least one workplace remotely. At least one human performs work at or in this workplace. Pollutants that are dangerous to a human may be emitted at the workplace. The monitoring system and the monitoring process should be able to be set up relatively quickly.

The object is achieved by a monitoring system with monitoring system features according to the invention and by a monitoring process with monitoring process features according to the invention. Advantageous embodiments of the monitoring system according to the invention are, as far as useful, also advantageous embodiments of the monitoring process according to the invention and vice versa.

The monitoring system according to the invention and the monitoring process according to the invention enable at least one workplace to be monitored remotely. Preferably, the monitoring system according to the invention and the monitoring process according to the invention allow at least two workplaces to be monitored remotely at the same time.

The monitoring system according to the invention comprises a monitoring unit for the monitored workplace or a respective monitoring unit for each monitored workplace, optionally at least two monitoring units for at least one monitored workplace. The monitoring unit or each monitoring unit comprises in each case
  at least one camera, optionally at least two cameras,
  at least one gas measuring device (gas detector), optionally at least two gas measuring devices, and
  a signal-processing workplace computer.

The camera or each camera of a monitoring unit is capable of generating an image signal of the monitored workplace. The image signal shows the workplace completely or at least partially and preferably comprises a sequence of images, in particular a video sequence, of the workplace. The camera or each camera is preferably configured to generate the image signal during the entire time period in which the workplace is being monitored. It is possible that the monitoring system comprises at least two cameras, each of these two cameras generating in one embodiment a respective image signal from the same workplace and generating in another embodiment image signals from two different workplaces. A camera, a gas measuring device, and the workplace computer of a monitoring unit may each be located in the workplace or outside the workplace. It is possible that a camera and/or a gas measuring device are arranged in the workplace and another camera and/or another gas measuring device are arranged outside the same workplace and the latter generates signals from the workplace from the outside.

The gas measuring device or each gas measuring device of a monitoring unit is capable of respectively measuring an indicator of, or a measure for, the concentration of at least one target gas that occurs or can occur in or at the monitored workplace. Optionally, the gas measuring device or at least one gas measuring device is capable of simultaneously measuring an indicator for the respective concentrations of at least two target gases. The target gas or one target gas is, in particular, a combustible or toxic gas or other gas that is harmful or dangerous to a human. It is also possible that the gas measuring device measures whether the oxygen concentration at the workplace is sufficiently high. In a first alternative, the gas measuring device or each gas measurement device at a workplace is capable of comparing a measured target gas concentration to a specified concentration threshold. In a second alternative, a target gas concentration measured by a gas measuring device at a workplace is transmitted to the workplace computer of the monitoring unit for that workplace, and the workplace computer compares the target gas concentration to the concentration threshold. If the measured target gas concentration is above the concentration threshold or generally outside a specified range of values, the gas measuring device (first alternative) or the workplace computer (second alternative) is capable of automatically generating an alarm and triggering transmission of the alarm to a spatially remote receiver. It is also possible that the alarm is triggered when the target gas concentration is below the concentration threshold. An example of this is the oxygen concentration at the workplace, which must not fall below a predefined lower threshold.

It is possible, but thanks to the invention not required, that a human (operator, e.g.) compares the measured target gas concentration with the range of concentration values and triggers an alarm. Further, it is possible but thanks to the invention not required, that the central output computer or an optional central computer receives a signal containing the measured target gas concentration from the monitoring unit and applies a decision rule to that signal to generate an alarm. This possible embodiment would require a measured target gas concentration to be transmitted from the monitoring unit to the control center. The invention allows a measured target gas concentration to be transmitted to the control center but eliminates the need for such data transmission. Thus, the invention saves data traffic, in particular data traffic from the monitoring unit to the first control center.

It is also possible that both the alarm and the message with the measured target gas concentration are transmitted to the control center, optionally with the type of detected target gas. Because the monitoring unit generates the alarm, it is possible and preferred to transmit the alarm to the control center with a higher priority than the target gas concentration. This embodiment is particularly advantageous when a public mobile radio network is used to transmit messages from the communication unit to the control center. The message with the target gas concentration makes it easier for an operator at the control center to assess the situation at the workplace where the alarm was triggered.

If the central output computer or an optional central computer were to apply a decision rule to the measured target gas concentration, it would be necessary to store and keep up to date the decision rule on the central output computer or on the optional central computer. In particular, it would generally be necessary to provide an upper threshold for a harmful target gas and/or a lower threshold for the oxygen concentration, for example. The danger would arise that the decision rule would not be up to date or that in the control center no decision rule would be available for the gas measuring device. The invention thus reduces the risk of the unwanted event that a target gas is not detected or that a false alarm is generated.

In one embodiment, the gas measuring device itself or the monitoring unit for the monitored workplace issues an alarm. Thus, in this embodiment, the alarm is issued both in or at the workplace and at the first control center. The output at the workplace and the output at the first control center are based on the same target gas measurement and the same range of concentration values. The invention eliminates the need to transmit a signal containing the target gas concentration to the central output computer or optional central computer and then, conversely, transmit an alarm back to the workplace. This generates additional data traffic and can result in a time delay.

It is possible for a worker at the workplace to carry the gas measuring device or a gas measuring device while performing the work at the workplace. Preferably, however, the gas measuring device or at least one gas measuring device is stationary at the workplace, at least as long as the workplace is monitored according to the invention. This enables the gas measuring device to measure a target gas concentration in an area of the workplace even if no person with a gas measuring device is currently present in this area. In particular, it is possible to warn a person before and against entering this area. Furthermore, in many cases, fewer gas measuring devices are required in this embodiment than there are workers at the workplace. It is possible that at least one gas measuring device is arranged stationary at a workplace and at least one further gas measuring device is carried by a worker at this workplace.

Preferably, the gas measuring device is configured to measure the target gas concentration and compare it to the concentration threshold throughout the time period in which the workplace is being monitored. It is possible that the monitoring system comprises at least two gas measuring devices, wherein in one application the two gas measuring devices measure target gas concentrations at the same workplace, in particular of two different target gases, and in another application target gas concentrations at two different workplaces.

The camera or each camera and the gas measuring device or each gas measuring device of a monitoring unit are permanently or at least temporarily connected or connectable to the workplace computer of this monitoring unit during an operation, namely by cable and/or wirelessly, in particular by radio waves. Preferably, the wired connection can be disconnected again. Thanks to this wired or wireless data connection, the camera or each camera and the gas measuring device or each gas measuring device are able to transmit a respective signal to the workplace computer. In particular, the gas measuring device or each gas measuring device is able to transmit an alarm and optionally a measured target gas concentration to the workplace computer.

It is possible that a data connection to the workplace computer can be established selectively by cable or wirelessly. If the camera or the gas measuring device are connected to the workplace computer by cable, the cable is used for transmitting the signal, otherwise the signal is transmitted wirelessly, in particular by radio waves. Optionally, the workplace computer is able to trigger a data transmission in the opposite direction and thereby transmit a message to at least one connected device of the monitoring unit.

The monitoring system according to the invention further comprises a communication unit (router) and a control center. The control center is physically remote from the communication unit and from the monitoring unit and is located outside the monitored workplace. In one embodiment, the communication unit is located outside the workplace and, in another embodiment, is located at or in the monitored workplace. The embodiment with the communication unit located outside the workplace in many cases eliminates the need for the communication unit to meet a high requirement for explosion protection and/or resistance to harmful gases. The feature with a separate communication unit thus makes it easier to comply with safety requirements.

A data connection is established or can at least temporarily be established between the workplace computer and the communication unit. It is possible that at least two workplace computers are connected to the same communication unit. The data connection uses a cable and/or wireless data transmission, in particular by radio waves. Preferably, a connection established by cable can be disconnected again. In one embodiment, this data connection is selectively established via a cable or wirelessly via radio waves. If a wired connection is established, this connection is used for the data transmission, otherwise a data transmission via radio waves.

The workplace computer is capable of transmitting signals from the or each connected camera, from the or each connected gas measuring device and optionally from the or each further connected device to the communication unit via this data connection. In particular, the workplace computer is capable of transmitting an alarm from a connected gas measuring device to the communication unit. Preferably, the workplace computer is capable of conversely transmitting a message to at least one connected device of the monitoring unit. This message affects, for example, the setting of a sensor at the workplace.

The first control center comprises a central output computer. A data connection (data link) is established or can be established at least temporarily between the communication unit and the central output computer. This data connection is or comprises a wireless data connection, in particular a data connection via radio waves. In one embodiment, this data connection is established using a public mobile radio network. Via this data connection, signals can be transmitted from the or each workplace computer to the central output computer via the communication unit. Preferably, conversely, a message can be transmitted from the central output computer to the or a workplace computer via the communication unit.

Both the workplace computer and the communication unit are capable of transmitting data, but over different distances. The workplace computer of the monitoring unit for a workplace receives data from the sensors in or at that workplace, in particular the or each gas measuring device and the or each camera, and forwards the data received from the sensors to the communication unit. Optionally, the workplace computer receives a message from the communication unit and forwards it to at least one connected sensor. In many cases, the workplace computer can be connected to at least one sensor using a cable, otherwise or additionally using a wireless data connection on a local area network. The data connection between the workplace computer and the communication unit also only needs to bridge a relatively small distance and can be implemented with a cable and/or in a local network.

The communication unit, on the other hand, receives data from the or each connected workplace computer and forwards it to the central output computer over at least part of the transmission distance wirelessly, e.g., in a wide area network. Preferably, the distance between the communication unit and the central output computer is at least twice as great, and more preferably at least ten times as great, as the distance between the communication unit and the or each workplace computer.

The control center further comprises at least one output unit. The or at least one output unit preferably comprises at least one display screen. Optionally, an output unit comprises a voice output unit. The central output computer is adapted to drive the or each output unit. The controlled output unit is adapted to output a signal transmitted from the monitoring unit to the central output computer in at least one form perceptible by a human being, in particular the image signal of a camera and any alarm of a gas measuring device, and optionally a voice signal. The output unit is capable of outputting the signal in particular visually and/or acoustically and/or haptically (by vibrations). Preferably, the image signal is output visually and the alarm at least acoustically and/or haptically, the voice signal acoustically.

The controlled output unit outputs a representation for the monitored workplace. On the one hand, the representation for the workplace shows each alarm from the or each gas measuring device at this workplace, in at least one form perceptible by a human being, preferably visually perceptible. On the other hand, at any time during the monitoring, the representation shows the respective image signal from the or at least one camera at that workplace. The preferred embodiment that the alarm is output visually eliminates the need to acoustically notify the operator at the control center of an alarm. Such an acoustic output can be overheard, especially if the operator is currently exchanging voice messages with a worker at the workplace. It is also possible to output an alarm in the first control center both visually and acoustically. It is also possible for an alarm to be issued visually in the first control center and acoustically in another control center.

The invention reduces the risk that a worker performing work at a monitored workplace will be injured at that workplace without anyone else noticing. In particular, thanks to the gas measuring device, the monitoring unit is able to detect whether a target gas has leaked (escaped) in or at the workplace at a concentration above the concentration threshold or is present for some other reason, and then generate an alarm. Because an image signal generated by a camera at the monitored workplace is transmitted to the control center, an operator at the control center is enabled to visually monitor the workplace remotely. In particular, the operator can determine how many and which persons are currently in or at the monitored workplace, whether a worker at the workplace has suffered an accident or a fainting spell, and also whether or not each worker is wearing the respective prescribed protective equipment. It is possible, but thanks to the output of the image signal not necessary, for an optional image evaluation unit to automatically search for unwanted events in the image signal of the camera.

Because the control center is physically remote from the or each monitored workplace, noxious gases, contaminants, and other mechanical or chemical pollutants, as well as noise, are not capable of having a harmful effect on an operator or on the equipment in the control center. Spatial restrictions that often apply at a monitored workplace do not affect the control center.

The invention can be combined with the use of a safety post, i.e. a person who monitors the workplace on site, as a backup or redundancy solution. However, the invention obviates the need to provide such a safety post at the workplace. Rather, an operator can monitor a workplace remotely, namely from the control center, optionally at least two workplaces simultaneously.

According to the invention, a signal from a sensor of the monitoring unit is not transmitted directly to the central output computer, but to the workplace computer, from there to the communication unit and from there to the central output computer. In the same way, a message is transmitted in the opposite direction. In particular this feature has the following advantages:

The workplace computer can be located in or near the monitored workplace and, in one embodiment, can supply electrical power to at least one sensor at the workplace. In some cases, a sensor can be connected to the workplace computer by means of a cable. The workplace computer is able to process signals locally and optionally perform further calculations. Thanks to the workplace computer, it is not necessary to transmit measured values from a sensor at the workplace to the central output computer, to have them evaluated by the central output computer, and optionally to transmit an evaluation result back to the workplace. The configuration with the workplace computer thus saves data traffic compared to a configuration in which measured values are transmitted directly from the sensors at the workplace to the central output computer and reduces the risk of a time delay in data transmission.

The communication unit eliminates the need to provide a device in or at the monitored workplace wherein this device is capable of transmitting data to the control center, thereby bridging the distance between the workplace and the control center. It is sufficient that the workplace computer is able to transmit the signals from the sensors to the communication unit. The communication unit can be installed in or at the monitored workplace or in the vicinity of the workplace. Because only a relatively short distance has to be bridged between the workplace computer and the communication unit, a local data network can be set up and used in many cases. The communication unit forwards signals received from the workplace computer and does not necessarily need to perform any further calculations. Thanks to the workplace computer, the communication unit also does not need to be directly connected to a sensor at the workplace. It is possible to connect the same communication unit to several workplace computers for different workplaces.

According to the invention, the data connection between the communication unit and the central output computer is established by means of a data connection, wherein this data connection comprises or is configured as a wireless data connection. In many cases this feature makes it easier to position the central output computer in a desired position relative to the monitoring unit, even at a great distance from or even close to the monitored workplace. The positioning of the central output computer is not limited by the maximum possible length of a cable or by the availability of a stationary power supply network in the vicinity of the monitored workplace.

According to the invention, the central output computer is able to control the or each output unit, and the controlled output unit generates a respective representation for the or each monitored workplace. The representation for the workplace shows the image signal of the or at least one, preferably each camera of this workplace as well as in at least one form perceptible by a human being, in particular visually, acoustically and/or haptically, each alarm of the or each gas measuring device.

According to the invention, a representation is output for the monitored workplace. This representation shows the respective image signal of the or each camera at this workplace at any time during the monitoring. Therefore, an operator in the control center can remotely monitor the workplace at any time. In many cases, this embodiment provides a higher level of security compared to an embodiment in which an image signal is only displayed when a sensor or the monitoring unit at the workplace has generated an alarm. The operator in the control center can in many cases detect a possibly dangerous situation by evaluating the image signal, even if this dangerous situation has not or not yet led to an alarm. It is possible, but thanks to the invention not necessary, that an image evaluation unit automatically evaluates the image signal from the camera at the workplaces and decides whether a dangerous situation has occurred. Such an image evaluation unit may in some cases not be able to detect a dangerous situation. Furthermore, such an image evaluation unit could produce many false alarms.

In one embodiment the monitoring system is configured for simultaneously monitoring at least two workplaces. For every monitored workplace the monitoring system comprises a respective monitoring unit, each monitoring unit comprising at least one camera, at least one gas measuring device, and a workplace computer. The communication unit of the monitoring system is connected or connectable with every workplace computer by means of a respective data connection. Preferably, the communication unit is positioned outside of every monitored workplace.

In a preferred embodiment, the wireless data connection between the communication unit and the central output computer—or the wirelessly implemented part of the transmission link—is implemented using a public mobile radio network (mobile phone network, cellular network). This embodiment eliminates the need to lay a cable or set up a directional radio link specifically for monitoring the workplace. Instead, an infrastructure that is usually already available, namely an existing public mobile radio network, is used for monitoring the working place. Therefore, the use of a public mobile radio network saves time required to set up the system and process for monitoring the workplace according to the invention and to dismantle it later if required. In addition, the public mobile radio network is often capable of bridging a large distance between the communication unit and the central output computer. Therefore, the control center can ideally be set up at any place on earth where a connection to a public mobile radio network is available.

In one embodiment, this public mobile radio network is implemented with the aid of a central computer. This central computer can be located remotely from the control center, ideally also at any location on earth with a connection to a public mobile radio network. Thanks to the public mobile radio network, the central computer is permanently or at least temporarily in a data connection with the communication unit and permanently or at least temporarily in a data connection with the central output computer.

In one embodiment, on this central computer a monitoring system area is provided and used for the monitoring system according to the invention. In one implementation, this monitoring system area is provided and used permanently for the monitoring system according to the invention, and in another implementation, it is provided and used only for a specific time period during which the work at or in the monitored workplace is performed and completed. It is possible that the monitoring system is used in a first period for monitoring a first workplace and in a subsequent second period for monitoring a second workplace. It is also possible that a monitoring system area on a first central computer is used in the first time period and a monitoring system area on a second central computer is used in the second time period, wherein the two central computers may be different from each other and spatially remote from each other. This implementation makes it possible to permanently monitor the workplace, i.e. during the entire day, and eliminating the need that an operator must perform a night shift.

At least one program is installed in this monitoring system area, including at least one processing program, for example a web server implemented as software. This processing program, when executed on the central computer, then generates a set of data (presentation data) that can be represented in at least one form that can be perceived by a human being, in particular visually and/or acoustically. The processing program uses the received signals from the monitoring units to generate this presentation data set. This data set is hereinafter referred to as "prepared data" or presentation data. This presentation data is transmitted to the central output computer, for example in response to a request from the central output computer. Preferably, this prepared data is continuously updated and transmitted. The prepared data comprises a visually displayable or otherwise displayable processing (presentation data) of each alarm from the or each gas measuring device, and a visual representation of the respective image signal from each camera. Optionally, the prepared data includes representations of other signals from at least one device that is set up at the monitored workplace and connected to the workplace computer.

According to the embodiment just described, the central output computer generates the control for the output unit using the presentation data generated by the central computer and using an output program installed on the central output computer, for example a web browser. The representation that the controlled output unit outputs shows the displayable presentation data generated by the processing program in at least one form that can be perceived by a human.

Preferably, a unique Internet address is assigned to the monitoring system area used on the central computer. With the aid of the unique Internet address, the output program can query data and thus also the presentation data from the monitoring system area. It is also possible that the communication unit is assigned a unique Internet address and the output program can query data from the communication unit. These two embodiments can be combined.

Functionally, the monitoring system area on the central computer with the or each processing program thus belongs to the control center, even if it is installed on the central computer and not in the control center. Below it is specified what the central output computer and/or generally the control center can be configured for and/or what steps they can execute. This description includes the possibility that some of these configurations and steps are realized and/or executed by the or each program on the central computer.

The arrangement that on the central computer the processing program is installed, which generates the presentation data, makes it possible to use a central output computer, which requires a smaller computing capacity and/or storage capacity than if the output computer itself would generate the representation for the output unit in the control center and would use for this directly the alarms and signals from the workplace computer. This in turn allows the central output computer to be configured as a relatively small and lightweight device, particularly a portable computer, especially a laptop or tablet or smartphone. The central computer, on the other hand, can be relatively easily equipped with the necessary computing capacity. It does not require an output unit capable of outputting a signal from a device at a monitored workplace or an input unit for user inputs.

Optionally, the monitoring system comprises a second control center in addition to the control center serving as a first control center. The second control center is spatially remote from the communication unit and from the monitored workplace, just like the first control center. In the case of several monitored workplaces, both control centers are spatially remote from each place. In addition, the second control center is spatially remote from the first control center. Just like the first control center, the second control center includes a central output computer and an output unit. The monitoring system area of the central computer is permanently or at least temporarily in a data connection with the second central output computer, that is, with the central output computer of the second control center. The further central output computer is able to control the output unit of the second control center and to cause the second output unit to output a representation. Preferably, a second output program is installed on the second central output computer. The representation on the second output unit is generated in exactly the same way as the representation on the output unit of the first control center using that presentation data which the processing program has generated on the central computer. The same presentation data generated by the same processing program is thus displayed twice, namely on different output units.

This embodiment makes it possible to monitor the workplace selective in the first control center or in the second control center. Each control center is permanently or at least temporarily in a data connection with the same monitoring system area of the central computer and uses the same presentation data that the processing program of the central computer has generated. Both control centers therefore use the same presentation data and thus the same signals from the devices (sensors) at the monitored workplace, and they do so simultaneously except for possibly different transmission times. It is not necessary that an alarm or other signal be transmitted from a workplace computer to the first control center and from the first control center to the second control center. Rather, the two control centers are arranged in parallel.

On the one hand, the configuration with at least two control centers creates redundancy because the same workplace is or can be monitored simultaneously by two operators in two control centers. This reduces the risk of a dangerous situation being overlooked. On the other hand, this configuration increases safety. Indeed, it is possible that an operator in one center can no longer perform the monitoring of the or each workplace, for example, due to a technical defect or a weakness, or that an operator commits a human error. In this case, the other center is still available for monitoring. The physical distance between the two control centers reduces the risk of both control centers failing simultaneously due to a technical effect or external circumstances.

In some cases, the use of two control centers makes it easier to monitor the workplace around the clock without having an operator in one center working at night. The two control centers are placed in different time zones for this application. Each control center is used during a period that falls within a specified temporal range of the day in that time zone, for example, between 06:00 in the morning and 06:00 in the evening. Of course, it is also possible to monitor the same workplaces from three control centers.

It is possible that the second control center is implemented with the aid of a portable computer, in particular a tablet or smartphone. An operator can carry this device with him/her and perform monitoring from any location, especially in the vicinity of a monitored workplace.

It is possible that an operator in the first control center is regularly requested to enter a user input. If no user input made in the first control center is registered within a time period of a specified duration, the monitoring system automatically switches to the second control center, optionally after a request to an operator in the first control center to now make a user input. This embodiment further increases the reliability of remote monitoring.

The advantages of the first control center described above, as well as the advantageous embodiments of the first control center described below, can be applied equally to the second control center.

According to the invention, the image signal from the camera in or at the monitored workplace is transmitted to the central output computer via the workplace computer for this workplace, the communication unit, and the wireless data connection. Preferably, this transmission is carried out via a public mobile radio network, optionally via a radio link instead. This transmission requires bandwidth. In a public mobile radio network used according to the preferred embodiment, other communication units typically also consume bandwidth, often at the same time, so that the monitoring system according to the invention at least temporarily competes with other communication units for the currently available bandwidth. The transmission of an image signal usually requires more bandwidth than the transmission of an alarm or another signal from a workplace. Therefore, the situation may arise where the currently available bandwidth is insufficient to transmit the image signal or each image signal to the central output computer with the maximum possible image quality.

In the following, an embodiment that solves this problem is described below. According to the embodiment with the mobile network and the central computer, signals from various devices of the monitoring unit are transmitted to the central computer and from there further to the central output computer as part of the presentation data. These signals include at least one image signal generated by the or a camera of the monitoring unit. As a rule, the transmission of the image signal requires a significantly larger bandwidth than the transmission of the other signals from the devices of the monitoring unit. This is because the other signals generally do not include image data or even video data.

According to the embodiment, the or at least one, preferably each camera of the monitoring system has at least one bandwidth-relevant parameter which can be changed by external control. It is possible that at least one camera has several bandwidth-relevant parameters. The current value of a bandwidth-relevant parameter influences the bandwidth required to transmit an image signal from this camera to a spatially remote receiver. By controlling the camera from outside, the currently used value of a bandwidth-relevant parameter can be changed. This change can be carried out during operation. During operation, the camera is used to monitor a workplace and generates an image signal. The monitoring system is able to automatically control the or at least one, preferably each camera, which has at least one externally changeable and bandwidth-relevant parameter. The objective of this control is that the respective value of at least one bandwidth-relevant parameter is changed. The change due to the control causes the bandwidth to be changed, wherein this bandwidth is required for transmitting the image signal from this camera. In particular, the required bandwidth is at least temporarily reduced. It is also possible to temporarily increase the bandwidth in order to obtain an image signal with a higher image quality.

In one embodiment, an operator in the control center causes the value of the or at least one bandwidth-relevant parameter of a previously selected camera to be changed by a corresponding user input, thereby reducing or increasing the required bandwidth. Preferably, the operator selects at least one camera, and the monitoring system automatically changes the value of the or each bandwidth-relevant parameter of the selected camera. Optionally, the operator also determines whether to improve the image quality of the image signal from the selected camera or, alternatively, to accept that the image quality will be degraded. For example, the operator selects one camera and thus specifies that it currently suffices that the image signal from this camera only has a lower image quality than other image signals.

In a preferred embodiment, however, a component of the monitoring system is able to automatically determine an indicator of the bandwidth currently available in the public mobile radio network or in a directional radio link used for transmitting signals from the communication unit to the central output computer. In particular, the monitoring system component is able to automatically detect an indicator for insufficient bandwidth. Typically, signals are transmitted in the form of data packets. In this case, the monitoring system component is preferably able to detect the event that data packets are lost ("packet loss", "packet drop"). The loss of data packets is an indicator for insufficient bandwidth. The monitoring system is able to automatically control at least one camera with the goal of changing the value of the or at least one bandwidth-relevant parameter. It is possible, but thanks to this configuration not necessary, that the camera itself automatically detects the indicator for low bandwidth and changes the bandwidth.

These two embodiments can be combined. In this combination, both the operator can select a camera, and the monitoring system can automatically control at least one camera with the aim of changing, in particular reducing, the required bandwidth.

According to the embodiment just described, the component of the monitoring system is able to automatically determine a measure of the bandwidth that is currently available in the public mobile radio network used or in a directional radio link used to transmit signals from the communication unit to the central output computer. Different forms of implementation are possible as to which part of the monitoring system is able to determine this measure of the bandwidth.

In one implementation, the central output computer is able to automatically determine the available bandwidth. In another implementation, the communication unit does this. In a preferred implementation, however, the monitoring unit is able to automatically determine the indicator of the currently available bandwidth. The determined bandwidth refers to the transmission path from the workplace computer via the communication unit to the central output computer or to an optional central computer. In the case of several workplace computers preferably every workplace computer can determine the respective bandwidth indicator. The determined bandwidth can be different for different workplace computers.

The embodiment that the workplace computer determines the indicator for the bandwidth has the following advantage in particular: The transmission of an image signal from a camera to the central output computer requires the most bandwidth. The image signal from the camera is transmitted via a transmission link. This transmission path comprises a first part between the camera and the workplace computer and a second part between the workplace computer and the central output computer. The first part can be realized by a cable and/or a local wireless network and usually provides sufficient bandwidth. Insufficient bandwidth usually only affects the second part of the transmission path, i.e. the transmission from the communication unit to the central output computer. The workplace computer is usually better able to determine the bandwidth in this second part of the transmission path than the central output computer or an optional central computer. In addition, this embodiment eliminates the need to transmit a message to the workplace computer, the message comprising the available bandwidth. Preferably, the workplace computer causes a different value to be assigned to the bandwidth-relevant parameter of the connected camera.

In one embodiment, a data connection between the communication unit and the central output computer is established using a public mobile radio network, and this public mobile radio network is implemented using at least one central computer. In one embodiment, the monitoring system according to the invention uses a monitoring system area of the central computer. On this central computer, the processing program described above may be installed and belong to the monitoring system area. It is possible that the central output computer or the communication unit or also the workplace computer queries the available bandwidth from the central computer.

The image quality with which image signals are displayed on an output unit in the control center generally essentially depends on the bandwidth currently available in the public mobile radio network or in a directional radio link used. The bandwidth available in the data connection between the workplace computer and the communication unit or in the data connection between the camera and the workplace computer of a monitoring unit, on the other hand, generally has little influence on image quality. As a rule, there are no other communication units competing for the bandwidth available for data transmission from the camera to the communication unit. Therefore, the workplace computer is usually able to detect insufficient bandwidth, even if the workplace computer is not directly connected to the public mobile radio network.

Preferably, the workplace computer is able to control the or each camera connected to it with the objective of changing the value of the bandwidth-relevant parameter and thereby reducing or also increasing the required bandwidth. Particularly preferably, the workplace computer is able to cause the respective parameter value of the or each connected camera to be changed, in response to the determination of the currently available bandwidth. The last described implementation, in which the workplace computer itself determines the indicator of the currently available bandwidth, eliminates the need for a message concerning the available bandwidth to be transmitted to this workplace computer. Rather, each workplace computer reduces or even increases the respective required bandwidth as needed, independently of the or each other workplace computer and also independently of the communication unit and the central output computer and the optional central computer. In many cases, this has the particular effect of rapidly reducing the required bandwidth if required. In many cases, it is ensured that—despite lower bandwidth—every image signal is still transmitted to the central output computer, albeit possibly with lower image quality. This ensures that even with lower bandwidth, the or each workplace is continuously monitored.

On the one hand the embodiment that the workplace computer controls the or each camera with the objective of changing the value of the bandwidth-relevant parameter saves the necessity that the central output computer directly controls the camera. Thus, data traffic is saved, and the risk of large latency is reduced. On the other hand, this embodiment eliminates the need for the camera itself to have a control unit capable of changing the parameter value depending on an available bandwidth. This makes it easier to configure the camera. In many cases, it is made easier to achieve that the camera meets specified safety requirements, for example, for explosion protection.

According to the embodiment just described, a component of the monitoring system, in particular the workplace computer, is able to automatically change at least one value of a bandwidth-relevant parameter of a camera and thereby reduce or also increase the bandwidth required for transmitting an image signal from this camera to a spatially remote receiver. Preferably, the workplace computer is able to control the camera and thereby change the parameter value.

The implementation described below leads to the following result: The more persons (people) currently stay at a workplace, the more bandwidth is available to transmit an image signal from a camera located in or at this workplace, and the higher is the image quality of the image signal. This effect is advantageous for the following reason: the more persons stay in or at the workplace, the greater is the risk, as a rule, that a person will be injured there due to an accident or other event, or the greater the risk that a person will not be wearing the prescribed personal protection equipment. Therefore, it is desirable that the more persons stay there, the higher is the image quality with which images from that workplace are displayed on the output unit. If currently no person stays there, the image quality may be lower, and less bandwidth is required. Nevertheless, an image signal is also transmitted in this case, in particular as such person may be in or at the work place without being registered or recognized.

Different forms of implementation are possible to determine how many persons are currently in or at a workplace. It is possible that the operator in the control center counts how many persons are shown in an image signal, this image signal originating from a camera in or at this workplace. It is also possible that an image evaluation unit evaluates the or each image signal from the camera to determine the number of persons present. The implementation described below avoids the need for an operator or even an image evaluation unit to count the persons. This implementation can be combined with counting by evaluating a displayed image signal.

According to this implementation, the monitoring unit includes at least one access control unit. Preferably, a person logs on to this access control unit when entering the workplace and logs off again when leaving the workplace. Each logon and logoff results in a signal from the access control unit.

With the help of signals from this access control unit, the monitoring system is able to determine how many persons currently stay in or at this workplace. In one implementation, the workplace computer for this workplace determines how many persons stay at the workplace. This implementation eliminates the need to transmit signals from the access control unit to the control center. In another implementation, the central output computer or an optional central computer determines the number of persons. This implementation eliminates the need to equip the workplace computer with the necessary computing capacity. It is also possible for the access control unit itself to count how many persons currently stay in or at the monitored workplace and to send the respective signal to the workplace computer or to the control center. In all forms of implementation, the determined number of persons currently staying in or at the workplace and preferably a respective identifier for each person is output on the or an output unit of the control center in a form that can be perceived by a human being, in particular visually.

In order to determine the number of persons staying in or at the monitored workplace, in one implementation the central output computer uses the signals from the access control unit, with these signals being transmitted to the central output computer via the workplace computer and the communication unit. In a preferred embodiment, the above-mentioned optional central computer for the mobile network automatically counts how many persons currently stay in or at the workplace and inserts the result of the count into the above-described presentation data. For counting, the central computer uses signals from the access control unit. The central output computer queries the central computer for the determined number of persons, in particular as part of the queried presentation data (web presentation data).

In one implementation, the workplace computer uses signals from the access control unit to determine how many persons currently stay in or at the monitored workplace, and optionally which persons these are. In another implementation, the workplace computer merely detects the event that a person has logged in or logged out and transmits a corresponding message to the central output computer. Preferably, this message comprises a detected unique identifier of the person who has logged in or logged out. The central output computer or the central computer or the workplace computer counts how many persons are currently in or at the monitored workplace according to the signals from the access control unit.

An embodiment has already been described above in which the monitoring system is able to control the or at least one camera at the monitored workplace with the objective of changing the value of a bandwidth-relevant parameter. Preferably, the workplace computer itself is able to control the camera. A suitable control of the camera reduces the data traffic between the control center and the monitoring unit for the workplace. This embodiment can be combined with the embodiment of determining the number of persons currently staying in or at the monitored workplace. In many cases, the combination results in less bandwidth being required to transmit an image signal from the workplace without significantly reducing the reliability of the monitoring.

According to this combination, the monitoring system is able to control the camera depending on the determined number of persons staying in or at the workplace. Preferably, the workplace computer of the monitoring unit performs the control for the workplace. The control changes the value of the bandwidth-relevant parameter as required. One objective of the control is that the lower the determined number of persons is, the lower is the required bandwidth. A reason is: in many cases, the image signal may show less detail with a low number of persons being at the workplace than with a high number. On the other hand, the controlled camera continuously transmits an image signal during monitoring, i.e., even when the access control unit has not detected a person. In particular, this takes into account the possibility that a person may be in or at the workplace without having been registered by the access control unit. Furthermore, in many cases it is possible to warn a person before entering the workplace, for example if a dangerously high target gas concentration or a mechanical hazard occurs there, in particular a visible hazard.

Using a signal from the access control unit for a workplace, a part of the monitoring system, such as the central output computer, may determine that no person is currently in or at the workplace. However, this result may be erroneous, particularly if a person has entered the workplace without logging in to the access control unit, or if the access control unit erroneously fails to register a person's log-in, or if a signal from the access control unit is not transmitted to the workplace computer. Therefore, also in this case, preferably an image signal is transmitted from the workplace to the central output computer, in particular with a relatively low image quality.

According to the embodiment just described, the or at least one camera can be controlled with the objective of assigning a different value to a bandwidth-relevant parameter of the camera. As a result, the bandwidth required to transmit the image signal of this camera to the central output computer is changed.

As a rule, the more bandwidth is used to transmit the image signal, the greater is the image quality. In order to achieve the highest possible image quality, in a preferred embodiment the image quality is increased on a trial basis. This is done by assigning a correspondingly changed value to at least one bandwidth-relevant parameter on a trial basis. The change is achieved by an external control while the workplace is being monitored, preferably by the workplace computer. Automatically it is checked whether after the assignment the bandwidth is currently sufficient to transmit an image signal for a higher image quality or not. Preferably, this check checks whether data packets are lost. If the bandwidth is not sufficient, the same or also another bandwidth-relevant parameter of the camera or another camera at the same workplace is assigned a different value with the objective of reducing the required bandwidth again. In many cases, this configuration results in the available bandwidth being well utilized and an image signal with a high image quality being transmitted, even if the total available bandwidth varies over time. It is possible to perform this step again, preferably with a given repetition rate.

As explained above, in one embodiment, a part of the monitoring system, preferably the workplace computer, is capable of controlling the or at least one camera, preferably each camera, with the objective of assigning a different value to at least one bandwidth-relevant parameter of the camera and then using this parameter value. The parameter value affects the bandwidth required to transmit the image signal from that camera to a spatially distant receiver. Typically, the greater the bandwidth used, the greater the image quality with which the image signal is visually displayed in the control center. A preferred implementation of a camera with several bandwidth-relevant parameters is described below.

According to this implementation, the or at least one camera comprises a photosensor and a signal-processing image processing unit and preferably its own control unit. The photosensor is capable of generating images depending on impinging electromagnetic waves, in particular light beams, and of at least temporarily storing them in a data memory of the camera. Two bandwidth-relevant parameters concerning the photosensor are the resolution (number of pixels)—this is the number of pixels of an image that the photosensor generates, and the frame rate ("frames per second", "image repetition rate"), which is the number of frames per time unit with which the photosensor generates images.

The camera can be controlled externally with the objective of changing the resolution and/or frame rate.

The image processing unit generates the image signal, which is transmitted from this camera to the central output computer and output on the output unit in a manner that can be perceived by a human. To generate the image signal, the image processing unit uses images from the photosensor and applies an algorithm to these images. Another bandwidth-relevant parameter is a parameter of the algorithm that the image processing unit applies. Preferably, the algorithm causes the images of the photosensor to be compressed so that the image signal requires less bandwidth than if the images of the photosensor were transmitted without processing with compression. The image processing unit parameter affects the algorithm that the image processing unit uses to process images of the photosensor to generate the image signal. Therefore the algorithm parameter is another bandwidth-relevant parameter. Preferably, the parameter influences the compression rate that the image processing unit achieves. By controlling it from outside, a different value can be assigned to the parameter for the algorithm. It is possible that several bandwidth-relevant parameters influence this algorithm and that a different value can be assigned to each of these parameters independently of one another by an external control.

Therefore, a camera in many cases has in total at least three bandwidth-relevant parameters, i.e. at least three parameters whose values influence the bandwidth required to transmit an image signal from this camera to the central output computer.

At least one of the bandwidth-relevant parameters mentioned can be changed by external control, preferably at least two parameters. Particularly preferably, at least two or even all parameters can be changed independently of each other. A camera often has the bandwidth-relevant parameters just mentioned. It is also possible that only one of these parameters can be changed by external control and that each of the others remains constant during operation.

According to the invention, the controlled output unit at the control center outputs one representation for each monitored workplace. This representation for a workplace shows during the monitoring each alarm from the or each gas measuring device at this workplace as well as at each time during the monitoring the respective image signal of at least one camera, preferably each camera, at this workplace.

In one embodiment, the output unit comprises a screen. On this screen, a respective representation is output for the or each monitored workplace, which representation functions as the or a representation within the meaning of the patent claims. Thus, if n workplaces are monitored simultaneously, n representations are simultaneously output on this screen. An operator in the control center can thus simultaneously monitor n workplaces while looking at the screen.

For the output of the representation, each monitored workplace is assigned a respective area on the screen, i.e. for n monitored workplaces n different screen areas on the same screen, and the representation for the workplace is output in this assigned screen area. The representation output in the screen area for a monitored workplace shows, on the one hand, the respective image signal from the or each camera at this workplace. On the other hand, the representation in the screen area comprises visually perceptible information as to whether or not the or at least one gas measuring device or the workplace computer at this workplace is currently generating an alarm. It is possible to additionally output such an alarm acoustically or haptically (by vibrations). In one embodiment, the display for a monitored workplace additionally comprises an identification of this workplace.

According to this embodiment, both the image signal and the information as to whether or not there is an alarm at the workplace are output visually in the same screen area. It is possible but not necessary to additionally output a measured target gas concentration in this screen area. This feature of the embodiment leads to a particularly ergonomic display. An operator in the control center can assign an alarm to an image signal or vice versa an image signal to an alarm quasi at a glance. The operator recognizes at a glance at which workplaces an alarm concerning a harmful target gas concentration is currently generated, and at the same time sees at least one image signal from this workplace without having to let his or her attention wander back and forth between two different screens or screen areas. The operator does not need to evaluate a textual description of a workplace or detect an audible output of an alarm to associate an alarm with an image signal or vice versa. In many cases, this embodiment allows multiple workplaces to be reliably monitored simultaneously in the same control center.

In many cases it is not necessary to output by a separate information to which workplace an alarm refers. Furthermore, thanks to this configuration, the user does not need to switch between a visual and another display mode, in particular not between a visual display of an image signal and an acoustic output of an alarm. This feature is particularly advantageous and leads to a particularly ergonomic monitoring if an operator in the control center monitors several workplaces simultaneously.

It is possible that the output unit comprises at least one further screen. Preferably, more detailed information about a workplace is output on this further screen triggered by the event that the or a gas measuring device or the workplace computer has generated an alarm referring to this workplace or that the operator has previously selected this workplace. In one implementation, the more detailed information includes the or at least one, preferably each, measured target gas concentration at that workplace.

The monitoring system according to the invention can be used to permanently monitor at least one workplace remotely. According to another application, the monitoring system according to the invention is used to remotely monitor at least one workplace only during a specified time period. During this time period, at least one task is performed and completed in or at the monitored workplace. Preferably, a technician assembles the monitoring system or at least the monitoring unit until the beginning of this period, enables monitoring of the workplace from the control center during this period, and disassembles the monitoring system or at least the monitoring unit after completion of the work. It is possible that the same monitoring system is subsequently used to monitor at least one other workplace. The same control center at the same location, as well as the same monitoring unit, can be used to remotely monitor first a first workplace and then a second workplace. Because the monitoring system or at least one monitoring unit can be assembled and disassembled, devices of the monitoring system can be reused, especially devices of the monitoring unit as well as the communication unit.

This application requires the monitoring unit to be transported to the vicinity of the workplace to be monitored, the workplace computer, the or each camera, the or each gas measuring device, and optionally at least one other device of the monitoring unit to be brought into a respective desired position relative to the workplace to be monitored, and then the necessary data connections to be established. This is facilitated if the entire transmission unit can be carried by a human and no vehicle or crane is required for transportation. Therefore, the devices of a monitoring unit preferably have a total mass (summed mass) of at most 20 kg, especially preferably at most 10 kg. This embodiment allows a human to transport the devices to the workplace in a suitable container, for example in a backpack, and a technician to assemble the devices there.

Preferably, the devices of the control center and the communication unit can also be transported by a single person. Particularly preferably, the total weight (summed weight) of all the devices of the control center is at most 50 kg, in particular at most 20 kg. Preferably, the weight of the communication unit is less than 5 kg, particularly preferably less than 2 kg. This embodiment makes it possible to set up the control center for an operation in sufficient proximity to the or at least one monitoring unit and to dismantle it again after an operation. "Sufficient proximity" means, in particular, that the public mobile radio network or the directional radio link used is sufficient for the transmission of signals to the central output computer. The control center devices can be used to monitor different workplaces sequentially. Preferably, the processing program described above, and optionally other functions of the control center are not installed on the central output computer, but on the central computer for the public mobile radio network described above. This embodiment makes it easier to transport the control center devices.

Preferably, each device of the or each monitoring unit is configured as an intrinsically (inherently) safe device, i.e. fulfills requirements to explosion proof. In particular, suitable components of each device ensure that the current intensity and the electrical voltage as well as the emission of thermal energy are limited at any time during operation and that no sparks escape. The device can therefore be used in a potentially explosive environment, in particular an environment in which at least one flammable (combustible) target gas can escape. In many cases, configuration of the monitoring unit exclusively with intrinsically safe devices allows the following procedure: The devices of a monitoring unit are transported individually to the workplace to be monitored, and the devices are assembled at or in the workplace to form the monitoring unit. Because the devices are intrinsically safe, this procedure is possible even if this workplace is a potentially explosive environment. In many cases, it is possible, but not necessary thanks to the intrinsically safe devices, to assemble the monitoring unit outside the workplace in a non-hazardous environment and then transport the assembled monitoring unit as a whole to the workplace.

It is often desired that a person in or at the or a monitored workplace and an operator in or at a control center can exchange voice messages. In a preferred embodiment, therefore, the monitoring unit comprises a voice input unit and a voice output unit, which preferably comprise a microphone and a speaker and are located in or at the monitored workplace. The control center also comprises a voice input unit and a voice output unit, which preferably comprise a headset and a microphone. Thanks to the headphones, the operator can listen to voice messages without being disturbed or distracted by noise in his or her environment. A person in or at the monitored workplace can enter a voice message into the voice input unit at the workplace, which message is transmitted via the workplace computer, the communication unit, the wireless data connection, and the central output computer to the voice output unit in the control center, where it is output acoustically, preferably on the headphones. Conversely, an operator at the control central can input a voice message into the voice input unit at the control central, and this voice message is transmitted to the workplace via the central output computer, the wireless data connection, the communication unit, and the workplace computer, and is output acoustically there, preferably on the loudspeaker there. The use of a speaker at the workplace eliminates the need for a worker to use headphones at the workplace. However, it is also possible for the voice output unit at a workplace to additionally include headphones so that a worker can understand the voice message even in the presence of high ambient noise.

According to the invention, the controlled output unit in the control center is capable of outputting signals from the or each monitored workplace, in at least one form that can be perceived by a human. The controlled output unit generates a representation for the or each monitored workplace. These signals each include an image signal from the or each camera in or at that workplace, and an alarm from the or each gas measuring device. Optionally, these signals further include target gas concentrations measured by the gas measuring device and/or voice messages from a person at the workplace and the number of person currently staying in or at the workplace. The central output computer is capable of controlling the output unit. In a preferred embodiment, the output unit comprises an overview screen and at least one further screen for a visual output of image signals and optionally of further signals. Each screen can be controlled by the central output computer. The controlled overview screen is capable of visually displaying simultaneously the image signals from at least two cameras—of course only if these two cameras simultaneously generate image signals and are each in a data connection with the central output computer. The two cameras can be installed in or at the same workplace and belong to one and the same monitoring unit. They can also belong to two different monitoring units for two different monitored workplaces. In particular, thanks to the overview screen, the operator can visually monitor several workplaces at the same time (simultaneously).

The central output computer can control the overview screen. The overview screen is controlled in such a way that one respective area of the overview screen is used for each monitored workplace. The display for this workplace is output in this screen area. For n monitored workplaces, therefore, one respective representation is output in each of n screen areas. In particular, the respective image signal of the or each camera at the workplace is output in this screen area. Preferably, this screen area also shows in a visually perceptible way whether the or at least one gas measuring device at the monitored workplace is currently generating an alarm or not.

In one embodiment, the or each additional screen is connected to the overview screen by means of a hinge, such as the two wings of an altarpiece. This embodiment makes it possible to fold two screens together and then transport them.

The or at least one other controlled screen can output information about one workplace at a time. This workplace was previously selected. It is also possible that a gas measuring device at this workplace is currently generating an alarm. Preferably, the controlled further display continues to output information about this workplace until another workplace is selected or the output of information is terminated.

In one embodiment, the operator in the central output computer has selected this workplace. In another embodiment, the central output computer has received an alarm from the or a gas measuring device or from the workplace computer or from another device in or at that workplace, and based on that alarm, the workplace is automatically selected. Among the information about the workplace that is output to the further screen is preferably the or at least one target gas concentration that the gas measuring device has measured that is outside of the specified range of concentration values. This target gas concentration thus triggered the alarm. The alarm and a message with the target gas concentration were transmitted from this workplace to the control center, whereby the alarm was preferably transmitted with a higher priority. So, on the further screen, information about this workplace with the alarm is output. This embodiment makes it easier for the operator to determine the cause of an alarm and trigger appropriate action. Preferably, the information output also includes the or at least one image signal from a camera at this workplace and/or the number and/or the names of the persons who are at this workplace according to the signals from the access control unit.

According to the invention, the or each gas measuring device or the workplace computer of the monitoring unit is capable of automatically generating an alarm if the or a measured target gas concentration is a range of concentration values specified for this target gas. This concentration threshold is preferably stored in a data memory of the gas measuring device. This alarm is transmitted to the central output computer. In one embodiment, the central output computer is able to control the output unit in response to the receipt of an alarm in such a way that the following effect is achieved: The controlled output unit outputs a list, visually or in another form perceptible by a human. The outputted list specifies the workplace to which the alarm relates, that is the workplace at or in which the gas measuring device that generated the alarm is positioned. Further, the list specifies at least one action, preferably any action, to be taken in response to the alarm at the workplace. This embodiment facilitates an operator to quickly trigger the or each required action when an alarm is generated and output at the control center. The risk is reduced that a required action is not taken at all or is taken too late.

In one implementation, the list additionally comprises an input field for at least one, preferably for each, measure named in the list. By making an entry in this input field, the operator triggers, in one implementation, the action shown in the list and to be performed without necessarily having to perform any further action. In another implementation, the operator confirms having triggered the action by making an input. Preferably, the central output computer generates a message to the operator if the operator has not yet entered a confirmation for an action named in the list.

Further above, an embodiment was described in which the output unit comprises an overview screen and at least one further (additional) screen. Preferably, the list just described is output on the or one further screen.

It is possible for the output unit to include two additional screens. This allows two different workplaces to be selected simultaneously. This is particularly advantageous if a gas measuring device or other device has generated an alarm almost simultaneously at each of two different workplaces. Particularly preferably, a list is displayed on a further screen for each selected workplace.

An arrangement has already been described above in which a respective screen area is assigned to each monitored workplace on the overview screen. The representation for the workplace is output in this screen area. This representation comprises the respective image signal from the or each camera at the workplace. In addition, the representation is output in a first manner when a gas measuring device or the workplace computer generates an alarm for that workplace, and in a second manner when neither a gas measuring device nor the workplace computer generates an alarm. For example, the displayed image signal is surrounded by a frame, and the frame shows in a visually perceptible manner whether or not an alarm is generated. This frame visually separates the screen area for a workplace from the or any other screen area on the overview screen. The embodiment with the screen areas makes it easier for the operator to detect workplaces with alarms and to associate at a glance the image signals with the alarms. This embodiment can be combined with the embodiment described further above in which a list is displayed on another screen, the list relating to a workplace at which an alarm is generated. The combination of these two embodiments makes it easier for a user to associate the list with the image signal. The combination thus results in a particularly ergonomic configuration for monitoring.

Preferably, the or at least one workplace computer, and particularly preferably each workplace computer, comprises its own voltage supply unit (power supply unit). This configuration avoids the need to connect the workplace computer to a stationary power supply network. In many applications, this is not even possible or undesirable, especially because a long cable to the monitored workplace would be too dangerous. In addition, in some applications the workplace computer is intended to meet explosion protection requirements.

On the one hand, it is usually desired that this dedicated voltage supply unit supplies the workplace computer with electrical energy for as long as necessary. On the other hand, it is often desired that the voltage supply unit is relatively small and light, especially so that it can be easily transported to the workplace and/or detachably attached to the workplace. The latter constraint limits the electrical work that the voltage supply unit can provide. In addition, the own voltage supply unit should often be an intrinsically safe device. The following preferred implementation of a dedicated voltage supply unit meets these requirements.

According to this implementation, the voltage supply unit of the workplace computer comprises an internal voltage source and at least one external voltage source. Each voltage source (internal and external) is capable of supplying the or each electrical consumer of the workplace computer with electrical energy, optionally also a connected sensor. Preferably, each voltage source is rechargeable. Preferably, the workplace computer with the internal voltage source and the or each external voltage source are configured as intrinsically safe devices.

The internal voltage source is located in a housing of the workplace computer and is thus protected to a certain extent from external influences. The or each external voltage source is detachably connected to the workplace computer or can be detachably connected to it. In many cases, an external voltage source can thus be replaced during operation, i.e. in or at the monitored workplace, and be replaced by a new one. Replacement is particularly necessary when the previously used external voltage source is largely discharged. Often, monitoring of the workplace needs not be interrupted to replace the external voltage source. If the workplace computer and each external voltage source are configured as intrinsically safe devices, the replacement can even be carried out in a potentially explosive environment.

As long as possible, the or each electrical consumer of the workplace computer and each connected consumer is supplied with electrical energy from the or a connected external voltage source. "As long as possible" means: As long as the fill level of the connected external voltage source is greater than or equal to a specified first level threshold. The or each electrical consumer of the workplace computer is supplied from the internal voltage source only if no external voltage source is connected or if the or each connected external voltage source has a fill level below the first level threshold. The internal voltage source thus acts as a kind of buffer store for electrical energy. One reason for preferring to use an external voltage source is the following: While an external voltage source can often be replaced during operation, it is usually not possible to replace or recharge the internal voltage source during operation, especially if the workplace computer is used in a potentially explosive environment. This is usually true even if the workplace computer is configured as an intrinsically safe device. At least, however, the exchange of the internal voltage takes longer than the connection to another external voltage source.

Preferably, a signal-processing control unit of the workplace computer switches between a supply from the or an external voltage source and a supply from the internal voltage source. Preferably, the control unit repeatedly checks whether at least one external voltage source with a sufficient fill level is connected and then, if this is the case, switches to this external voltage source.

Preferably, the workplace computer generates a message when the level of the or a connected external voltage source has fallen below a specified second level threshold. The second level threshold is greater than or equal to the first level threshold. The message is output in a form that can be perceived by a human, for example on an output element of the workplace computer itself or on the output unit of the control center. If the second level threshold is greater than the first level threshold, more time is available to replace the external voltage source without having to use the internal voltage source. This is because the low-level message is output before the level reaches the first level threshold.

In one embodiment, the workplace computer can be connected to at least two external power sources simultaneously. This allows the workplace computer to be used for a longer time period without having to replace an external voltage source. Preferably, the or each electrical consumer is powered from a first external voltage source until the fill level of the first external voltage source has dropped below the first level threshold. Preferably, the second external voltage source is not used as long as the fill level of the first external voltage source is high enough. Subsequently, the electrical consumers are supplied from the or a second external voltage source. The time that elapses until the fill level of the second external voltage source has also fallen below the first level threshold is available for replacing the first external voltage source.

Preferably, the communication unit also comprises its own voltage supply unit. This can be constructed in exactly the same way as the one just described with reference to the workplace computer.

In one embodiment, the or each camera and/or the or each gas measuring device of a monitoring unit each comprises its own voltage supply unit. This can be configured as just described with reference to the workplace computer. It is also possible that at least one gas measuring device and/or at least one camera and/or an optional further device of the monitoring unit is supplied with electrical power by the workplace computer. The or at least one camera is thus an electrical consumer that is at least temporarily supplied with electrical energy by the workplace computer. These two implementations can be combined with each other. This combination makes it possible for the workplace computer to supply electrical energy to at least one further device of the monitoring unit by means of a cable, if this further device is arranged close enough to the workplace computer, but the further device can also be positioned at a remote location which can or should not be bridged by a cable. It is also possible that a device at the workplace can be supplied either by the workplace computer or by its own voltage supply unit.

It is also possible that the or at least one gas measuring device is supplied with electrical energy by the workplace computer.

According to the invention, the monitoring system comprises a communication unit and one monitoring unit for each monitored workplace. In a preferred embodiment, n workplaces are monitored simultaneously, where n>=2. The monitoring system comprises at least n monitoring units, each with a workplace computer, at least one camera and at least one gas measuring device. Preferably, the same communication unit is simultaneously connected to each of these n workplace computers. This embodiment saves equipment compared to an embodiment in which a separate communication unit is used for each monitored workplace. The embodiment also saves data connections compared to an embodiment in which each workplace computer or even each sensor is connected directly to the central output computer. It is sufficient to establish an at least partially wireless data connection between the communication unit and the central output computer.

According to an implementation of this embodiment, at least two workplace computers and the communication unit are connected in series ("daisy chain") as follows: A first data connection is established or can at least temporarily be established between the workplace computer of the first monitoring unit and the communication unit. A second data connection is established or can at least temporarily be established between the workplace computer of the second monitoring unit and the workplace computer of the first monitoring unit. Signals from the other devices of the second monitoring unit are transmitted to the communication unit as follows: from the device at the workplace to the workplace computer of the second monitoring unit, from there via the second data connection to the workplace computer of the first monitoring unit, and from there via the first data connection to the communication unit. Optionally, all n workplace computers for the n simultaneously monitored workplaces and the communication unit are connected in series. Signals from a sensor are thus forwarded through this series to the communication unit and from there to the central output computer. In many cases, the configuration with the series connection requires fewer data connections than other types of circuits, for example less than a star connection.

In order to be able to remotely monitor a workplace, it is necessary that a data connection is established between the devices of the assigned monitoring unit and the central output computer. It must be possible to quickly detect the undesired event that this data connection is interrupted during monitoring. In one embodiment, the central output computer generates a respective request message for each monitored workplace. Preferably, this request message is generated repeatedly, for example at fixed time intervals. The central output computer triggers the step of transmitting the request message for a workplace to the workplace computer of that workplace. In response to receiving the request message, the workplace computer generates a response message. This response message is transmitted to the central output computer. The central output computer checks whether a response message arrives from a workplace computer within a specified time period after the request message is sent to that workplace computer. If this is not the case, the central output computer generates an alarm and outputs this alarm in at least one form that can be perceived in the control center and optionally at the workplace by a human.

Preferably, a reverse sequence is performed additionally or instead. The or each workplace computer generates a request message at least once, and the generated request message is transmitted to the central output computer. The central output computer generates a response message that is transmitted to the workplace computer. If the workplace computer has sent a request message but has not received a response message from the central output computer within a specified time period, the workplace computer generates a warning and outputs it to the workplace in a form that can be perceived by a human. This warning warns the people staying in at the workplace that the workplace is currently not monitored. Preferably this reverse sequence is repeatedly performed, e.g. with a repetition rate.

These two embodiments may be combined, for example as follows: In response to receiving a response message, the central output computer generates an acknowledgement message. This acknowledgement message is transmitted to the workplace computer from which the response message originated. If the workplace computer does not receive an acknowledgement message from the central output computer within a specified time period after the response message is sent, the workplace computer generates an alarm and outputs it in a form that can be perceived at the workplace by a human.

In the following, the invention is described by means of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a perspective view showing the overview screen on the support and two additional screens.

DESCRIPTION OF PREFERRED EMBODIMENTS

Application of the Invention

In an embodiment, the invention is used to remotely monitor at least one spatial area while work is being performed in or on that area. The area to be monitored is hereinafter referred to as the "workplace". In particular, the workplace may be an enclosed space, such as the interior of a container for fluids or a warehouse or a space of a land vehicle, aircraft, or watercraft. A person performing at least one job at this workplace, for example, a welding job, is referred to as a "worker".

The or a workplace may leak gases that are harmful to a person. In addition, a worker may suffer an accident or a fainting spell. It is also possible that a worker is not wearing the safety equipment that is required for that workplace. Therefore, while the worker or at least one worker is working in the workplace, a human is monitoring the workplace remotely. This supervising human is referred to below as the "operator." The area where this operator monitors the workplace is referred to as the "control center".

The system that supports the operator in remotely monitoring the workplace, optionally several workplaces simultaneously, is called a "monitoring system". It is possible that the same operator monitors at least two workplaces simultaneously.

Components of the Monitoring System

The monitoring system includes
- one component per monitored workplace, which is set up in or at this workplace,
- a component in the headquarters and
- a communication unit (router) for bidirectional data transmission between the component at the workplace and the component in the control center.

The component of the monitoring system that is set up in or at the workplace is hereinafter referred to as the "monitoring unit".

Figure 1:
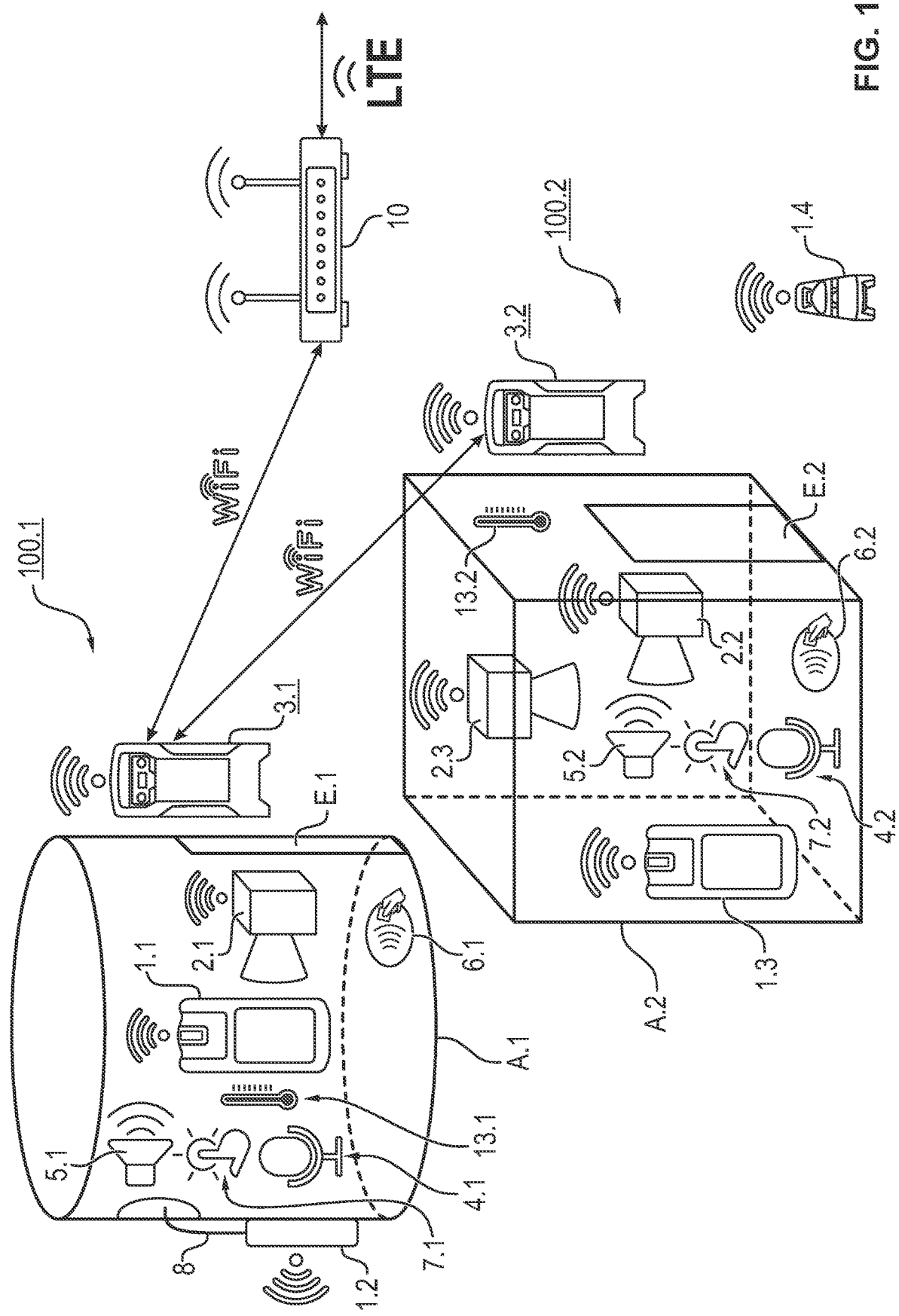
FIG. 1 is a schematic view showing two monitoring units and the communication unit.

FIG. 1 shows schematically
- two supervised workplaces A.1, A.2,
- one monitoring unit 100.1, 100.2 for each monitored workplace A.1, A.2 and
- a communication unit ("router") 10.

Both workplaces A.1, A.2 are arranged in an enclosed space. FIG. 1 schematically shows two entrances E.1, E.2 to the two workplaces A.1, A.2. A monitoring unit 100.1, 100.2 comprises
- at least one camera, optionally several cameras, directed at the workplace, in case of several cameras preferably with different viewing directions,
- at least one gas measuring device, (gas detector) optionally several gas measuring devices, preferably for different target gases,
- optionally at least one further sensor, for example a temperature sensor,
- a workplace computer,
- optionally an access control unit ("Batch-In/Batch-Out"),
- optionally a voice input unit comprising a microphone,
- optionally a voice output unit comprising a loudspeaker,
- optionally an alarm input element ("alarm button"),
- optionally an alarm element ("siren").

FIG. 1 shows the following devices, which in the embodiment example belong to the monitoring unit 100.1 for the workplace A.1:
- two gas measuring devices 1.1 and 1.2,
- a camera 2.1,
- an optional temperature sensor 13.1, which is attached to the gas measuring device 1.1,
- a workplace computer 3.1,
- a speech input unit 4.1,
- a voice output unit 5.1,
- an access control unit 6.1 and
- an alarm input element 7.1.

In the implementation shown, the workplace computer 3.1 and the gas measuring device 1.2 are arranged outside the enclosed space A.1, while the other devices are each arranged on the inside against a wall in the enclosed space. A hose 8 is led from the gas measuring device 1.2 into the enclosed space A.1. The gas measuring device 1.2 can suck a gas sample through the hose 8 out of the enclosed space A.1. It is also possible that all the devices of the monitoring unit 100.1 are arranged inside the enclosed space A.1. It is also possible that the workplace computer 3.1 is arranged inside the enclosed space A.1. This has the advantage that a user can read an indicator light of the workplace computer 3.1 and/or actuate an actuating element without leaving the enclosed space A.1. On the other hand, the workplace computer 3.1 must then meet higher explosion protection requirements in many cases.

FIG. 1 shows the following devices, which in the embodiment example belong to the monitoring unit 100.2 for the workplace 1.2:
- a gas measuring device 1.3, which is mounted inside on a wall of the workplace A.2,
- a gas measuring device 1.4 placed on the floor outside the workplace A.2 and in front of the entrance E.2,
- a camera 2.2 mounted inside on a wall of the workplace A.2,
- a camera 2.3 mounted inside on the ceiling of the workplace A.2,
- an optional temperature sensor 13.2,
- a workplace 3.2,
- a voice input unit 4.2,
- a voice output unit 5.2,
- an access control unit 6.2 and
- an alarm input element 7.2.

Again, the workplace computer 3.2 is arranged outside the monitored workplace A.2, the other devices in the workplace A.2. It is also possible that a workplace computer 3.1 or 3.2 is arranged in the workplace A.1, A.2.

In the embodiment shown in FIG. 1, the gas measuring devices 1.1 and 1.2, the temperature sensor 13.1, the camera 2.1, the voice input unit 4.1, the voice output unit 5.1 and the alarm input element 7.1 are connected wirelessly, in particular by radio waves, to the workplace computer 3.1. The gas measuring device 1.3, the cameras 2.2 and 2.3, the voice input unit 4.1, the voice output unit 5.1 and the alarm input element 7.1 are wirelessly connected to the workplace computer 3.2. This makes it easier to position each device at a suitable place in or at the monitored workplace A.1, A.2.

In another implementation, the camera 2.1, the voice input unit 4.1, the voice output unit 5.1, the access control unit 6.1 and/or the alarm input element 7.1 are supplied with electrical power by the workplace computer 3.1. It is possible that the camera 2.1, the voice input unit 4.1, the voice output unit 5.1, the access control unit 6.1 and the alarm input element 7.1 are detachably inserted, for example screwed, into a housing of the workplace computer 3.1.

Preferably, each camera 2.1, 2.2, 2.3 comprises its own light source to illuminate the workplace A.1, A.2. It is possible that the light source is permanently switched on and permanently illuminates the workplace A.1, A.2. It is also possible that a worker at workplace A.1, A.2 or an operator in the control center switches the light source on and off.

Preferably, each workplace computer 3.1, 3.2 comprises indicator lights and control elements. In one embodiment, each workplace computer 3.1, 3.2 additionally comprises an output unit on which alarms from a connected gas measuring device 1.1, . . . , 1.4 are output, preferably visually.

The part of the monitoring system installed in the control center includes
an overview screen,
optionally at least one additional screen,
optionally a voice output unit comprising a headphone,
optionally a voice input unit comprising a microphone,
a central output computer and
another communication unit.

Figure 2:
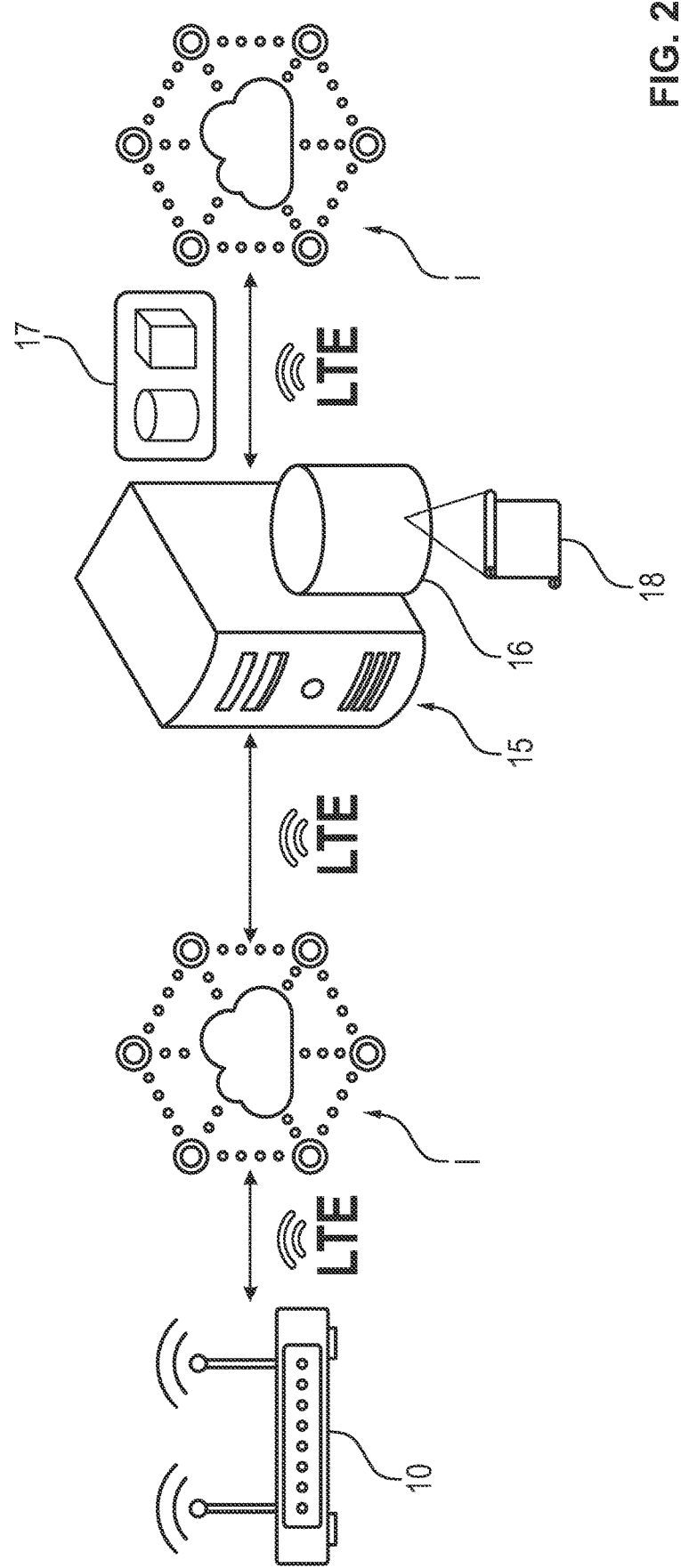
FIG. 2 is a schematic view showing the communication unit and a mobile network that realizes a data connection via a central computer.
Figure 3:
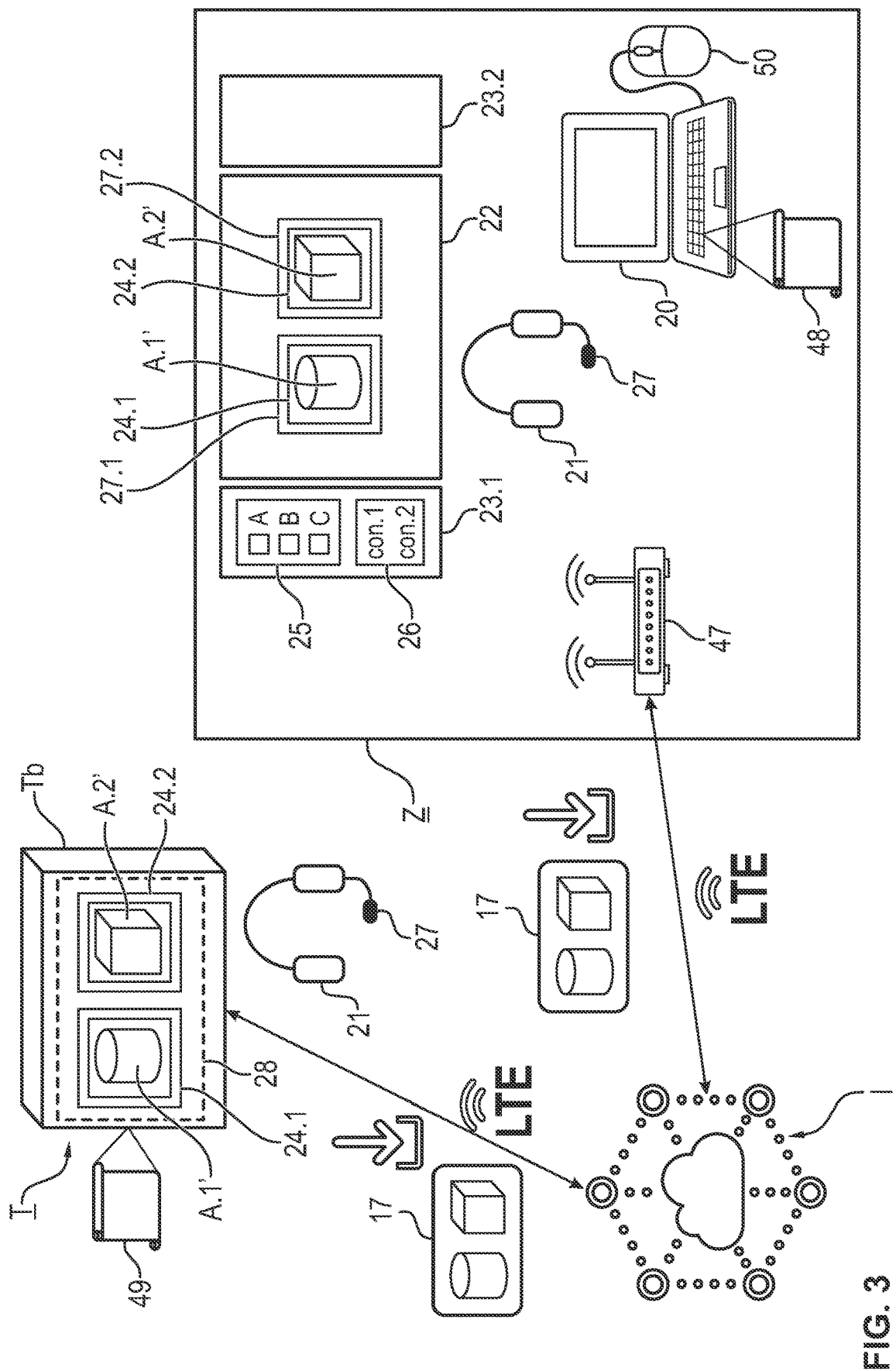
FIG. 3 is a schematic view showing a first control center and a second control center and their respective connections to the mobile network.

FIG. 2 and FIG. 3 schematically show the communication unit 10, a first control center Z and a second control center T. The communication unit 10 is connected to the control centers Z and T via the schematically shown Internet I or can be connected at least temporarily. The connection via the Internet I realizes a bidirectional wireless data connection. This data connection is established with the aid of a central computer 15. The communication unit 10 is located outside the workplaces A.1 and A.2 and therefore does not necessarily need to meet such high explosion protection requirements as the equipment in a workplace A.1, A.2.

The following devices of the first control center Z are shown:
a central output computer 20, which in the embodiment takes the form of a laptop computer with its own screen, a mouse 50 and its own keyboard,
a separate communication unit (router) 44,
one headphone 21,
a microphone 27 attached to the headphones 21,
an overview screen 22,
two further screens 23.1, 23.2, which are movably connected to the overview screen 22 in one implementation and are adjacent to the overview screen 22 in another implementation, and
an output program 48, such as a web browser, installed on the central output computer 20.

The headphones 21, microphone 27, and screens 22, 23.1, 23.2 are each in a data connection with the central output computer 20. The output program 48 is installed on the central output computer 20 and is executable there.

The central output computer 20 may also include a separate keyboard and/or additionally a mouse 50.

Two windows 24.1 and 24.2 are shown on the overview screen 22. Window 24.1 shows an image sequence A.1' from workplace A.1, window 24.2 shows an image sequence A.2' from workplace A.2. A frame 27.1 is arranged around window 24.1, and a frame 27.2 is arranged around window 24.2.

The second central output computer T is implemented by means of a tablet Tb. This tablet Tb acts as the second central output computer and includes a screen 28 and is connected or connectable to a headphone 21. The headphones 21 are connected to a microphone 27. An output program 49, such as a web browser, is installed on the tablet Tb. The screen 28 of the tablet Tb also displays two windows 24.1 for workplace A.1 and 24.2 for workplace A.2.

The central output computer 20 is able to control the or each screen 22, 23.1, 23.2 as well as the headphones 21. For this purpose, the output computer 20 uses an output program 48, 49 and the presentation data 17 described above, which was generated by the central computer 15. Optionally, an image evaluation unit is installed on the central output computer 20. This image evaluation unit automatically evaluates image signals from at least one camera, preferably each camera 2.1, 2.2, 2.3. One objective in the evaluation is to detect whether or not the images from a workplace A.1, A.2 show at least one moving person. In some cases, image evaluation can also detect an undesired event, for example a fire.

In one embodiment, the entire component of the monitoring system installed in the control center is implemented on a portable computer, in particular on a smartphone or tablet. Corresponding components of the portable computer act as the overview screen, the voice output unit, the voice input unit, and the central output computer. This is exemplified in FIG. 3 for the second control center T on the tablet Tb.

Functions of the Devices of a Monitoring Unit

The functions of these devices are described below.

The or each gas measuring device 1.1, 1.2, 1.3, 1.4 measures the concentration of at least one target gas at the monitored workplace A.1, A.2, optionally the respective concentration of several target gases, and compares the or each measured target gas concentration with a specified respective upper concentration threshold. If the or a target gas concentration is above the upper concentration threshold, the gas measuring device 1.1, 1.2, 1.3, 1.4 automatically generates an alarm. The measured target gas concentrations and alarms are transmitted to the control centers Z, T and output in at least one way that can be perceived by a human. It is also possible that only the measured target gas concentrations are transmitted to the control centers Z, T and the output computer 20 evaluates the transmitted measured values and generates the alarms.

In one embodiment, the or at least one gas measuring device 1.1, 1.3, 1.4 is located in or in front of the monitored workplace A.1, A.2, and gas diffuses into the interior of the gas measuring device 1.1, 1.3, 1.4 or is drawn in, e.g. by a pump of the gas measuring device 1.1, 1.3, 1.4. In another embodiment, at least one gas measuring device 1.2 is connected to a hose 8. The hose 8 is led into the interior of a workplace A.2 in the form of an enclosed space. The gas measuring device 1.2 is arranged outside this enclosed space A.2 and permanently draws in gas from the space through the hose 8, preferably with its own pump. This means that the gas measuring device 1.2 is not exposed to mechanical and chemical influences in the enclosed space.

The temperature sensor 13 1,3 10.2 measures an indicator of the temperature at the monitored workplace A.1, A.2. In one embodiment, the temperature sensor 13.1, 13.2 is capable of automatically generating an alarm if the measured temperature is outside a specified value range. This alarm indicates that it is too hot or too cold at the monitored workplace.

The or each camera 2.1, 2.2, 2.3 generates in each case an image signal, preferably a sequence of images, from the workplace A.1, A.2. The or each image signal from a camera 2.1, 2.2, 2.3 is transmitted to the control centers Z, T and displayed there in each case on the or at least one screen.

In one embodiment, at least one camera 2.1, 2.2, 2.3 has a light source, wherein this light source is configured to illuminate the monitored workplace A.1, A.2. Preferably, the light source emits light in the visible range, but it may also emit light in the infrared range. In one embodiment, this light source can be switched on and off by an external control. In one embodiment, each camera 2.1, 2.2, 2.3 can be switched on and off by a control from the outside to save energy.

Preferably, the or each camera 2.1, 2.2, 2.3 each has at least one, preferably several parameters whose respective value can be changed by an external control. Examples of these parameters are:
- the frame rate ("frames per second"),
- the resolution, i.e. the number of pixels per image,
- another parameter that affects the amount of data per unit time required to transmit an image signal from camera 2.1, 2.2, 2.3,
- the viewing direction, the viewing angle, the magnification and whether the optional light source is switched on or off.

In one embodiment, each camera 2.1, 2.2, 2.3 is configured during use in such a way that the viewing direction remains constant as long as the camera is mounted in or at the workplace A.1, A.2. In another embodiment, an actuator is assigned to at least one camera. This actuator is capable of moving the camera 2.1, 2.2, 2.3 and thereby changing the viewing direction of the camera 2.1, 2.2, 2.3. Preferably, this actuator can be controlled from the outside.

In one embodiment, each camera 2.1, 2.2, 2.3 has a fixed focal length and thus a fixed imaging scale. In another embodiment, the focal length and thus the magnification of the camera 2.1, 2.2, 2.3 can be changed, preferably by an external control.

In a preferred implementation, each camera 2.1, 2.2, 2.3 comprises a photosensor, its own image processor and its own control unit, and optionally also its own voltage supply unit. The photosensor is capable of generating digital images in response to electromagnetic waves, in particular light rays, incident on the camera 2.1, 2.2, 2.3. In one embodiment, the configuration of the camera 2.1, 2.2, 2.3 determines how many pixels a digital image has. In another embodiment, the resolution can be changed by an external control. The frame rate is the frequency at which the photosensor generates and delivers digital images. If the frame rate is too low, the undesirable event of the image signal being displayed on a screen in a jerky manner may occur.

The image processing unit generates an image signal from the sequence of digital images generated by the photosensor. Preferably, the image processing unit applies a compression algorithm. In order to transmit this image signal to a spatially distant receiver, an amount of data per time unit (bit rate) is required. This required bit rate depends on the image processing unit, in particular on the applied compression algorithm. At least one parameter influences the function of the image processing unit. This parameter is in particular a parameter of the compression algorithm. A very strong signal compression may result in a visual representation of the image signal in which details can hardly be recognized. The image processing unit parameter usually affects the bit rate required to transmit the image signal from the camera 2.1, 2.2, 2.3. It is possible that there are several such parameters that influence the compression algorithm and can be changed independently of each other.

A worker can enter a voice message into the voice input unit 4.1, 4.2 at the workplace A.1, A.2. This voice message is output to the operator by the voice output unit 21 in the control centers Z, T, preferably via the headphones 21. Accordingly, the operator can input a voice message, and this voice message is transmitted and output to the worker, preferably via the loudspeaker 5.1, 5.2. This allows the worker and the operator to exchange voice messages.

When a worker enters the workplace A.1, A.2, he or she logs in at the access control unit 6.1, 6.2, for example by holding an RFID chip on a card against an RFID reader of the access control unit 6.1, 6.2. When he or she leaves the workplace A.1, A.2 again, he or she logs out in the same way. When a person logs in, the access control unit 6.1, 6.2 determines which person has logged in or logged out. In one implementation, the workplace computer 3.1, 3.2 determines how many and which persons are currently at the workplace A.1, A.2 according to the access control unit 6.1, 6.2. This information is transmitted to the central control units Z, T, where it is output in a form that can be perceived by a human being. In another implementation, the respective identifier of a worker who has logged in or logged out is transmitted to the central output computer 20. The central output computer 20 uses this transmitted data to count how many workers are currently in or at the monitored workplace A.1, A.2.

It is possible that a worker enters the workplace A.1, A.2 without logging on to the access control unit 6.1, 6.2. It is also possible that the access control unit 6.1, 6.2 is defective or a data transmission is interrupted. For this reason, the workplace A.1, A.2 is preferably permanently monitored during the period in which work is or can be performed there.

The alarm element 7.1, 7.2 can be used by a worker to signal that an alarm is to be triggered at the workplace A.1, A.2 in a form that can be perceived by a human being. A corresponding alarm message is generated, transmitted to the control centers Z, T, and output to the operator. Preferably, a voice connection between the workplace A.1, A.2 and the control centers Z, T is also established automatically.

Data Transmission within the Monitoring Unit

The gas measuring device or each gas measuring device 1.1, 1.2, 1.3, 1.4 as well as the camera or each camera 2.1, 2.2, 2.3 and the optional temperature sensor or each optional temperature sensor 13.1, 13.2 are connected to the workplace computer 3.1, 3.2 by cable and/or wirelessly, in particular by radio waves. As wireless data connection between the or a gas measuring device 1.1, 1.2, 1.3, 1.4 and the workplace computer 3.1, 3.2 preferably Bluetooth is used, for the or each camera 2.1, 2.2, 2.3 preferably WLAN, e.g. Wi-Fi, or also Bluetooth is used.

Preferably, the workplace computer 3.1, 3.2 comprises several indicator lights in the form of LEDs. Some of these indicator lights indicate whether or not a data connection is currently established between the workplace computer 3.1, 3.2 and the other devices of the monitoring unit 100.1, 100.2. In addition, the workplace computer 3.1, 3.2 preferably comprises a relatively small screen on which error messages and other status messages are output, for example the current level of a voltage supply unit for the workplace computer 3.1, 3.2 and/or information about which persons are currently at the workplace A.1, A.2 according to signals from the access control unit 6.1, 6.2. optionally, an alarm from a connected gas measuring device 1.1, 1.2, 1.3, 1.4 is also output on this screen.

In one embodiment, the workplace computer 3.1, 3.2 automatically detects whether a gas measuring device 1.1, 1.2, 1.3, 1.4 and/or a camera 2.1, 2.2, 2.3 are connected with a cable. If this is not the case, the workplace computer automatically establishes a wireless data connection via radio waves. In one embodiment, a gas measuring device

1.1, 1.2, 1.3, 1.4 and/or a camera 2.1, 2.2, 2.3 can be mechanically connected to the workplace computer 3.1, 3.2, for example by means of a threaded connection or a plug connection. This connection can preferably be released again.

In one embodiment, the or each camera 2.1, 2.2, 2.3 is connected to the associated workplace computer 3.1, 3.2 via a respective cable. On the one hand, the image signal from the camera 2.1, 2.2, 2.3 is transmitted to the workplace computer 3.1, 3.2 via this cable. On the other hand, in one embodiment, the camera 2.1, 2.2, 2.3 is supplied with electrical power from the workplace computer 3.1, 3.2 via this cable. This embodiment eliminates the need to provide the camera 2.1, 2.2, 2.3 with its own voltage supply unit. It is also possible that the or each gas measuring device 1.1, 1.2, 1.3, 1.4 is connected to the workplace computer 3.1, 3.2 via a respective cable and, on the one hand, measured values of the gas measuring device 1.1, 1.2, 1.3, 1.4 are transmitted to the workplace computer 3.1, 3.2 via this cable.

In one implementation, the workplace computer 3.1, 3.2 supplies the gas measuring device 1.1, 1.2, 1.3, 1.4 with electrical energy via the cable. Preferably, on the other hand, the gas measuring device 1.1, 1.2, 1.3, 1.4 comprises its own voltage supply unit, and the measured values of the gas measuring device 1.1, 1.2, 1.3, 1.4 are transmitted wirelessly, in particular by radio waves, to the workplace computer 3.1, 3.2.

In one embodiment, a camera 2.1, 2.2, 2.3 and/or a gas measuring device 1.1, 1.2, 1.3, 1.4 and/or the workplace computer 3.1, 3.2 are able to automatically detect whether they are connected to the workplace computer 3.1, 3.2 via a cable and whether or not electrical energy is being transmitted via this cable. If this is not the case, the camera 2.1, 2.2, 2.3 or the gas measuring device 1.1, 1.2, 1.3, 1.4 switches over to its own voltage supply unit, or the devices are switched over accordingly by an external control. This embodiment further increases the flexibility of the monitoring system according to the invention. In particular, it is made possible to supply the camera 2.1, 2.2, 2.3 and/or the gas measuring device 1.1, 1.2, 1.3, 1.4 with electrical power from the workplace computer 3.1, 3.2 if the distance is short enough. On the other hand, it is possible to mount the camera 2.1, 2.2, 2.3 and/or the gas measuring device 1.1, 1.2, 1.3, 1.4 at a relatively large distance from the workplace computer 3.1, 3.2 without the length of a cable limiting the distance to the workplace computer 3.1, 3.2.

Preferably, the or each workplace computer 3.1, 3.2 checks whether or not there is still a data connection to each further device of the monitoring unit 100.1, 100.2. Particularly preferably, the workplace computer 3.1, 3.2 regularly polls each connected device. If a device does not respond, the workplace computer 3.1, 3.2 preferably generates a corresponding alarm message. The alarm message is transmitted to the central output computer 20, where it is output in a form that can be perceived by a human.

Explosion Safety

As already explained, harmful gases can escape at a workplace A.1, A.2 to be monitored, in particular explosive gases. Therefore, all components of the monitoring unit 100.1, 100.2 for this workplace A.1, A.2 are preferably configured as intrinsically safe devices. In one implementation, each device has a certification according to ATEX and/or IECx and/or fulfills the standard ISO 80079-36 and -37, thus fulfilling a relatively high requirement for explosion protection. In the case of an intrinsically safe device, the electrical current and the electrical power are limited at all times by suitable components in the device. This means that the device cannot trigger an explosion in any situation or under any operating conditions. In particular, the device does not generate any sparks that could escape to the outside and cause an explosion. In addition, an intrinsically safe device does not heat up to the point where the heated device can cause an explosion.

The configuration as an intrinsically safe device eliminates the need to surround the device with a flameproof housing made of metal and to separate the device fluid-tight from the environment. This would often not be possible at all for a gas measuring device, for example, and would also significantly increase the weight of the device.

Configuration of the Monitoring Unit as a Portable Unit

In the embodiment example, the workplace A.1, A.2 does not need to be permanently monitored, but only during a period in which at least one worker performs work there. Outside this period, no one is present at or in the workplace A.1, A.2. Before the start of the work to be monitored, a monitoring unit 100.1, 100.2 is set up at and/or in the workplace A.1, A.2 to be monitored, a data connection is established with the control center Z, T, and the workplace A.1, A.2 is monitored out of the control centers Z, T. After the end of the monitoring, the devices of the monitoring unit 100.1, 100.2 are disconnected from each other again. Because all devices of a monitoring unit 100.1, 100.2 are configured as intrinsically safe devices, it is possible to assemble the devices at or in the workplace A.1, A.2 to be monitored into the monitoring unit 100.1, 100.2 itself and to separate them from each other again later. Of course, it is also possible to assemble the devices outside the workplace A.1, A.2 to the monitoring unit 100.1, 100.2 and to transport the monitoring unit 100.1, 100.2 into the workplace A.1, A.2.

Preferably, the devices of a monitoring unit 100.1, 100.2 are configured as portable devices. Therefore, in many cases neither a vehicle nor a crane is required to transport the devices to the workplace A.1, A.2. Particularly preferably, the summed weight of all devices of a monitoring unit 100.1, 100.2 is below 20 kg, particularly preferably below 10 kg. Therefore, a single person can carry all devices of a monitoring unit 100.1, 100.2 to the workplace A.1, A.2 to be monitored and assemble them there. The fact that each device of a monitoring unit 100.1, 100.2 is designed as an intrinsically safe device and therefore does not necessarily have a flameproof housing contributes to this result. Such a flameproof housing often has a relatively high weight.

It is also possible that a person in the vicinity of the workplace A.1, A.2 to be monitored assembles the devices to the monitoring unit 100.1, 100.2 and carries the assembled monitoring unit 100.1, 100.2 to the workplace. Preferably, no aids at all or only common tools are required for assembling the devices to the monitoring unit 100.1, 100.2.

In one embodiment, the devices belonging to a monitoring unit 100.1, 100.2 are placed on the floor at or in the workplace A.1, A.2. In a preferred embodiment, however, they are detachably fixed. In particular, a device of a monitoring unit 100.1, 100.2 can be detachably attached to a component of the workplace A.1, A.2 in one of the following alternative implementations:

The device to be fixed includes at least one permanent magnet, and this is placed on a sufficiently large vertical or inclined magnetic surface of the workplace A.1, A.2.

The device includes a clamp fastening with a mounting plate. This clamp mounting is detachably mounted in a suitable recess or on a suitable mounting element of the workplace A.1, A.2.

The device includes a fastening element with which the device can be detachably fastened to a flange connection. Such a flange connection is often located at a monitored workplace A.1, A.2.

The device comprises a suction element, in particular a suction cup. This suction element is pressed onto a sufficiently large, load-bearing, and clean surface at the workplace A.1, A.2.

Preferably, at least one device comprises at least two of these possible fastening elements, i.e. a permanent magnet and/or a clamp fastening and/or a fastening element for a flange connection and/or a suction element, so that in many cases the device can be detachably fastened in at least one, preferably at least two, of the ways just described and need not be placed on the ground.

Data Transmission Between the Monitoring Unit and the Control Center

On the one hand, the communication unit 10 is in a bidirectional data connection with the workplace computer 3.1, 3.2 of a monitoring unit 100.1, 100.2. On the other hand, it is in a bidirectional data connection with the central output computer 20. The same communication unit 10 can be in a bidirectional data connection with at least two workplace computers 3.1, 3.2 at the same time, see FIG. 1.

The connected workplace computer or each connected workplace computer 3.1, 3.2 is connected to the communication unit 10 via cable or wirelessly, in particular via Wi-Fi. In one embodiment, a 10 Mbit or 100 Mbit Ethernet connection can be established using the cable. In one embodiment, the communication unit 10 is able to automatically detect whether a workplace 3.1, 3.2 is connected to the communication unit 10 by means of a cable. If the communication unit 10 detects a connected cable, data is exchanged between the workplace computer 3.1, 3.2 and the communication unit 10 via this cable, otherwise wirelessly, in particular via radio waves. It is possible that the communication unit 10 additionally supplies a workplace computer 3.1, 3.2 with electrical energy via a cable.

In one embodiment, the communication unit 10 is also detachably mounted, and particularly preferably in the vicinity of the or a monitored workplace A.1, A.2. The mounting elements described above with reference to the devices of the monitoring unit 100.1, 100.2 can also be used for the communication unit.

As already explained, it is possible to connect the same communication unit 10 to at least two different workplace computers 3.1, 3.2 and thereby to at least two different monitoring units 100.1, 100.2. Preferably, a series connection is implemented according to the "daisy chain" principle: A first workplace computer 3.1 is connected on the one hand to a second workplace computer 3.2 and on the other hand to the communication unit 10, cf. FIG. 1. The series connection saves the need to realize a star connection and requires fewer data connections. Preferably, signals are transmitted from the second workplace computer 3.2 via the first workplace computer 3.1 to the communication unit 10 and further to the control center Z, T, and vice versa, messages are transmitted from the control centers Z, T to the communication unit 10 and further via the first workplace computer 3.1 to the second workplace computer 3.2. This series connection is indicated in FIG. 1.

In the embodiment, the communication unit 10 is wirelessly connected to the central output computer 20 and to the tablet Tb of the mobile control center T via the Internet I and a public mobile radio network, for example via LTE (Long Term Evolution) or 5G. FIG. 2 schematically shows the Internet I, a central computer 15 and a cloud through which the communication unit 10 is connected to both the stationary control center Z and the mobile control center T, cf. FIG. 3. The two control centers Z, T are thus connected in parallel. In one embodiment, the central computer 15 receives the respective signals from the or each monitoring unit 100.1, 100.2 and stores them at least temporarily.

In the embodiment example, a monitoring system area 16 is provided on the central computer 15 and is used to monitor the two workplaces A.1, A.2. It is possible that the monitoring system area 16 is permanently assigned to the monitoring system according to the invention. Preferably, on the other hand, this monitoring system area 16 is used only for a specified time period to implement functions of the monitoring system according to the invention. The work at the workplaces A.1, A.2 takes place within this specified time period. Of course, it is possible to subsequently monitor at least one other workplace within this time period and to use the same monitoring system area 16 for this purpose. Preferably, at the end of this time period, the or each program and all data in monitoring system area 16 are deleted, and the monitoring system area is made available for other applications.

The monitoring system area 16 includes a processing program 18, for example a web server. This processing program 18 can be executed on the central computer 15. During its execution, the processing program 18 processes the signals from the devices at the workplaces A.1, A.2 and generates presentation data, in particular generates web presentation data (such as HTML) 17, which is a set of data that can be output in a form that can be perceived visually and/or acoustically and/or haptically by a human. An output program 48, 49 is installed on the central output computer 20, in particular a web browser. The central output computer 20 receives the presentation data or presentation data 17 from the central computer 15 via the Internet and causes the output program (web browser) 48, 49 to display the presentation data or presentation data 17 in the first control center Z. This will be described in more detail below. The tablet Tb of the second control center T receives the same presentation data 17 and displays the data via the output program (web browser) 49.

The use of a public mobile radio network I has in particular the following advantages compared to the alternative of establishing a directional radio link: It is not necessary to ensure a permanent line of sight between the communication unit 10 and the central output computer 20. Furthermore, in many cases it is not necessary to precisely align antennas of a workplace computer 3.1, 3.2 and/or the communication unit 10. Also, in many cases, a much greater distance can be bridged between the communication unit 10 and the workplaces Z. T. This provides greater flexibility as to where a control center Z, T can be positioned relative to a workplace A.1, A.2 to be monitored. Furthermore, it is made possible to monitor several workplaces in one and the same control center Z, T, whereby these workplaces are relatively far away from each other.

The or each workplace computer 3.1, 3.2 is capable of transmitting data from the connected devices to the central computer 15. In one implementation, the central computer 15 regularly polls each workplace computer 3.1, 3.2.

In one embodiment, a web server is installed on the central computer 15. A display program in the form of a web browser 48 is installed on the central output computer 20, and a display program 49 is installed on the tablet Tb. In one embodiment, a unique Internet address is assigned to the or each monitoring unit 100.1, 100.2. In another implementation, the communication unit 10 is assigned a unique Internet address. In a preferred embodiment, a unique Internet address is assigned to the monitoring system area 16 on the central computer 15. After a user has entered this Internet address into the web browser 48, 49, the central computer 15 transmits the above-described presentation data 17 of signals originating from the workplace computer 3.1, 3.2 of this monitoring unit 100.1, 100.2 or from the communication unit 10 to the central output computer 20 and to the tablet Tb, in particular image signals, alarms and other measurement results. This embodiment makes it possible to quickly establish a connection between the central output computer 20 and the tablet Tb on the one hand and the central computer 15 on the other hand.

At the beginning of an operation as well as during the operation, it must be ensured that a data connection is actually established between the or each monitoring unit 100.1, 100.2 and the control centers Z, T or not. If it is determined that no data connection has been established between a monitoring unit 100.1, 100.2 and a control center Z, T, an alarm is automatically triggered and issued in at least one form that can be perceived by a human being, preferably both at the workplace A.1, A.2 by the monitoring unit 100.1, 100.2 as well as in the control center Z, T. Preferably, an alarm is also generated and output if a gas measuring device 1.1, 1.2, 1.3, 1.4 or a camera 2.1, 2.2, 2.3 has failed.

An alarm triggered at or for a workplace A.1, A.2 preferably includes information that this workplace A.1, A.2 is to be evacuated.

Various configurations are possible for checking whether a data connection has been established and still exists between the control centers Z, T and a workplace A.1, A.2.

In one embodiment, the or each workplace computer 3.1, 3.2 generates a message repeatedly in such a way that there is at most a specified time interval between the generation of two successive messages. For example, messages are generated with a fixed frequency. Each message is transmitted to the central processing units Z, T. The central output computer 20 in the central processing units Z, T detects the undesired event that there is no data connection between a workplace computer 3.1, 3.2 and the central output computer 20 or the tablet Tb when at least one of the following events is detected:

There is no message at all from a workplace 3.1, 3.2.

The central output computer 20/tablet Tb has received a message from a workplace computer 3.1, 3.2, and after this reception a time period of a specified duration has elapsed without another message having arrived from this workplace computer 3.1, 3.2.

In a further embodiment, the central output computer 20/the tablet Tb repeatedly generates one message for each workplace computer 3.1, 3.2, again in such a way that there is at most the specified time interval between the generation of two successive messages. Each message is transmitted to the respective workplace computer 3.1, 3.2. The workplace computer 3.1, 3.2 detects the event that there is no data connection to a control center Z, T, if no message at all has been received from the control center Z, T or if a time period has elapsed since the last message was received from the control center Z, T, which time period has a specified duration.

The two embodiments just described can be combined.

In a further embodiment, the following steps are performed at the beginning of a deployment, and these steps are preferably performed again at least once during the deployment, preferably at a fixed frequency:

The central output computer 20 and the tablet Tb each generate a request message for each workplace 3.1, 3.2, and this request message is transmitted to the workplace 3.1, 3.2 via the central computer 15 and the communication unit 10, unless a fault has occurred.

As soon as the workplace computer 3.1, 3.2 receives this request message, it generates a response message. This response message is transmitted to the central output computer 20 and to the tablet Tb.

The central output computer 20 and the tablet Tb check whether or not a response message has arrived from a workplace computer 3.1, 3.2 after the step of transmitting a request message to that workplace computer 3.1, 3.2 and after a specified time period has elapsed. If no response message has then arrived, the central output computer 20/the tablet Tb generates an alarm referencing this workplace A.1, A.2.

Conversely, if a workplace A.1, A.2 does not receive a request message after an activation, the workplace A.1, A.2 also preferably generates an alarm. This alarm indicates that the relevant workplace A.1, A.2 may currently not be monitored.

Change in the Required Bandwidth

The wireless connection between the communication unit 10 and the control centers Z, T uses the Internet I and the public mobile radio network without influencing them. Therefore, this wireless connection strongly depends on the bandwidth that is currently available for data transmission between the communication unit 10 and the control centers Z, T. Different events in the vicinity of a monitored workplace A.1, A.2 can cause other communication units to consume a lot of bandwidth and therefore greatly reduce the bandwidth that is still available for data transmission between the communication unit 10 and the control centers Z, T. If at all possible, monitoring of the or each connected workplace A.1, A.2 should be maintained despite changing bandwidth.

Most bandwidth is required to transmit the respective image signal from the or each camera 2.1, 2.2, 2.3 to the control centers Z, T. Much less bandwidth is required to transmit the respective signal and, if applicable, an alarm of each gas measuring device 1.1, 1.2, 1.3, 1.4. The event that only a lower bandwidth than before is available and/or the event that not enough bandwidth is available is detected automatically. Preferably, the value of at least one parameter of the data transmission that correlates with the available bandwidth is determined. In particular, the following parameters are examined:

the latency—if this is greater than a given upper threshold, there is too little bandwidth available, and/or the loss of data packets during transmission (packet loss and packet drop).

As explained above, the image signal from the or each camera 2.1, 2.2, 2.3 at the monitored workplace A.1, A.2 requires the greatest bandwidth. Detection of insufficient bandwidth triggers the step of down-regulating the or each camera 2.1, 2.2, 2.3 currently providing an image signal to the communication unit 10. The down-regulating of the camera 2.1, 2.2, 2.3 comprises the step that the camera 2.1, 2.2, 2.3 is externally controlled and by the control at least one bandwidth-relevant parameter of the camera 2.1, 2.2, 2.3 is assigned a different value, i.e. a parameter influencing the bit rate required to transmit the image signal from the camera 2.1, 2.2, 2.3 to the control centers Z, T.

In one implementation, the control changes at least one of the following parameters of a camera 2.1, 2.2, 2.3 with the objective of reducing the required bandwidth:

The resolution, i.e. the number of pixels per image, is reduced.

The frame rate, i.e. the number of images generated per second ("frames per second"), is reduced.

The algorithm that the image processing unit applies to the images of the photosensor is modified in such a way that the images are more compressed and thus a single image takes up a smaller amount of data.

Preferably, each camera 2.1, 2.2, 2.3 is configured in such a way that the resolution, the frame rate, and the parameter for the image processing (compression) algorithm can be changed independently of each other by a corresponding external control.

As already explained, according to a preferred implementation, each camera 2.1, 2.2, 2.3 comprises a photosensor and an image processing unit. The photosensor generates a sequence of digital images at a variable frame rate ("frames per second"). The image processing unit generates the image signal from the sequence of digital images. The image signal is transmitted to the control centers Z, T via the workplace computer 3.1, 3.2 and the communication unit 10. In order to transmit this image signal, a quantity of data per unit of time (bit rate) is required. This bit rate is influenced by a variable parameter of the image processing unit, in particular by a parameter of a compression algorithm applied by the image processing unit. The resolution, the frame rate and the parameter acting on the bit rate are three externally variable bandwidth-relevant parameters of the camera 2.1, 2.2, 2.3.

The step of assigning a possibly modified value to each of the parameters just mentioned and using it is automatically triggered and reduces the bandwidth required to transmit image data from the respective camera 2.1, 2.2, 2.3 to the communication unit 10 and further to the control centers Z, T via a public mobile radio network. Such a measure is preferably triggered when an indication of low bandwidth is detected. In one embodiment, at least one action to reduce the required bandwidth is also performed when at least one of the following events is detected:

According to the signal from the access control unit 6.1, 6.2, there is currently no worker in or at the monitored workplace A.1, A.2. Note: It is possible that a worker is there but has not registered with the access control unit 6.1, 6.2. Therefore, even in this situation, images are transmitted to the control units Z, T, and the camera 2.1, 2.2, 2.3 is not switched off.

An image processing unit not shown evaluates images from the camera 2.1, 2.2, 2.3 and has detected by the evaluation that there is no movement in or at the workplace A.1, A.2, in a time period of a specified duration. Also in this situation, images continue to be transmitted to the control centers Z, T.

An operator in a control center Z, T has caused the value of a bandwidth-relevant parameter to be reduced for a camera 2.1, 2.2, 2.3. One reason may be that the operator requires an image sequence from another camera 2.1, 2.2, 2.3, the transmission of which requires a higher bandwidth.

It is possible that at least two cameras 2.1, 2.2, 2.3 are connected to the same communication unit 10, for example because a monitoring unit 100.2 comprises two cameras or because two different monitoring units 100.1, 100.2 each comprising one camera 2.1, 2.2, 2.3 are simultaneously connected to the communication unit 10, cf. FIG. 1. In one embodiment, the at least two connected cameras 2.1, 2.2, 2.3 are down-regulated in the same way. In another embodiment, a request is made to the operator in one or each control center Z, T to select a connected camera 2.1, 2.2, 2.3. The or at least one selected camera 2.1, 2.2, 2.3 is down-regulated, or the or at least one unselected camera 2.1, 2.2, 2.3 is down-regulated.

Various embodiments are possible as to which person or device triggers the down regulation of a camera 2.1, 2.2, 2.3. As explained above, from a control center Z, T, the operator may trigger the step of down-regulating any camera connected to a user-selected workplace 3.1, 3.2 or a user-selected camera 2.1, 2.2, 2.3. Preferably, the operator is notified that not enough bandwidth is available, and the operator selects at least one monitored workplace A.1, A.2. The workplace computer 3.1, 3.2 of the selected workplace A.1, A.2 then down-regulates the or at least one, preferably each camera 2.1, 2.2, 2.3 of the selected workplace A.1, A.2.

In one implementation, the central output computer 20 and the tablet Tb regularly query the central computer 15 as to which bandwidth is available in each case for a data transmission from a workplace computer 3.1, 3.2 to the central output computer 20 or the tablet Tb. The central output computer 20 and the tablet Tb transmit the queried bandwidth to the workplace computer 3.1, 3.2. It is also possible that at least one workplace computer 3.1, 3.2 regularly queries the central computer 15.

In a preferred embodiment, a workplace 3.1, 3.2 is able to automatically detect that the available bandwidth is insufficient. Lack of bandwidth usually results from the fact that the public mobile radio network I used does not provide sufficient bandwidth to transmit data from the communication unit 10 to the control centers Z, T. The connection between the workplace computer 3.1, 3.2 and the communication unit 10 is usually not affected by a low bandwidth, in particular not by a low bandwidth in the public mobile radio network I used. After the workplace computer 3.1, 3.2 has detected the low bandwidth for a workplace A.1, A.2, it controls the or at least one, preferably each connected camera 2.1, 2.2, 2.3 at the workplace A.1, A.2 in order to down-regulate the camera 2.1, 2.2, 2.3 and thereby reduce the required bandwidth.

The process just described does not require message exchange between different workplace computers 3.1, 3.2, nor does it require message exchange between a workplace computer 3.1, 3.2 and the communication unit 10 to reduce bandwidth. Rather, each workplace computer 3.1, 3.2 independently of any other workplace computer 3.2, 3.1 and also independently of the communication unit 10 reduces the bandwidth required to transmit image signals from the connected cameras 2.1, 2.2, 2.3 to the control centers Z, T.

If a workplace computer 3.1, 3.2 has detected a low bandwidth, it regulates each connected camera 2.1, 2.2, 2.3 downward as just described with the goal of reducing the respective required bandwidth. Here, the workplace computer 3.1, 3.2 causes a value of at least one bandwidth-relevant parameter that influences the bandwidth of a connected camera 2.1, 2.2, 2.3 to be changed with the goal of reducing the required bandwidth. Preferably, the workplace 3.1, 3.2 checks at least once what bandwidth is available after this reduction. If there is still not enough bandwidth available, the workplace computer 3.1, 3.2 again regulates down at least one connected camera 2.1, 2.2, 2.3 with the objective of reducing the bandwidth. Preferably, the workplace computer 3.1, 3.2 later again regulates the camera 2.1, 2.2, 2.3 in the other direction, i.e. changes at least one parameter value with the goal of again achieving a higher image quality through a higher resolution and/or higher frame rate and/or lower compression, even if this requires a higher bandwidth. In this way, each workplace 3.1, 3.2 automatically performs continuous closed-loop control of the bandwidth actually required to transmit the image signals from the connected cameras 2.1, 2.2, 2.3.

According to the embodiment just described, each workplace computer 3.1, 3.2 causes the value of at least one parameter of the or at least one, preferably each, connected camera 2.1, 2.2, 2.3 to be changed with the objective of reducing or also increasing the bandwidth, which bandwidth is required to transmit the image signals of all connected cameras 2.1, 2.2, 2.3. In one embodiment, the workplace computer 3.1, 3.2 changes the parameter value by a specified or also randomly selected absolute or percentage value.

In another embodiment, the workplace computer 3.1, 3.2 determines how many persons are currently in or at the monitored workplace A.1, A.2 according to the signals of the access control unit 6.1, 6.2. The workplace computer 3.1, 3.2 changes the parameter value with the following control objective: the greater the number of persons detected in or at the workplace A.1, A.2, the greater the bandwidth available for the transmission of cameras 2.1, 2.2, 2.3 in or at this workplace A.1, A.2. One reason: the more persons are currently staying there, the more important it is that the operator in a control center Z, T detects an undesired event quickly and reliably. If, according to the access control unit 6.1, 6.2, there is no one at all in or at the workplace A.1, A.2, the workplace computer 3.1, 3.2 causes a relatively low bandwidth. As already explained, however, even in this case at least one image signal is transmitted from this workplace A.1, A.2 to the control centers Z, T-among other things because a person may be there who has not logged in.

In one embodiment, the monitoring system comprises an image evaluation unit. This image evaluation unit is able to automatically evaluate the image signal of at least one camera 2.1, 2.2, 2.3 and to decide by means of the image evaluation whether the image signal currently depicts a movement or not. As a rule, this movement originates from a worker at the monitored workplace A.1, A.2, but it can also originate from a falling object or an object that has moved in some other way. According to the embodiment with the image evaluation unit, the bandwidth required for transmitting the image signal from a camera 2.1, 2.2, 2.3 is then reduced if this image signal does not show any movement.

As explained above, the bandwidth required to transmit the image signal from a camera 2.1, 2.2, 2.3 to the central output computer 20 and to the tablet Tb is reduced. Preferably, the workplace computer 3.1, 3.2 to which said camera 2.1, 2.2, 2.3 is associated causes the required bandwidth to be reduced. As explained above, at least one bandwidth-relevant parameter of the camera 2.1, 2.2, 2.3 is changed to reduce the bandwidth. Reducing the required bandwidth often also results in reduced image quality when displaying the image signal.

In a preferred embodiment, the image quality is therefore increased again on a trial basis, even if more bandwidth is required to transmit the image signal after the increase. To increase the image quality, at least one bandwidth-relevant parameter of the camera 2.1, 2.2, 2.3 is changed accordingly. Preferably, the workplace 3.1, 3.2 also triggers this magnification of the image quality automatically.

In one implementation, the step of increasing the image quality again is triggered at least when a specified time period has elapsed since a reduction of the bandwidth. Furthermore, it is possible that the image quality is enlarged on a trial basis even if the required bandwidth has not been reduced beforehand.

In one implementation, a workplace computer 3.1, 3.2 randomly magnifies image quality at random time points. For example, each workplace computer 3.1, 3.2 includes a respective random number generator that generates random time points. Alternatively, each workplace computer 3.1, 3.2 randomly magnifies image quality at a specified frequency, with each workplace computer 3.1, 3.2 applying a different frequency. Both configurations reduce the risk that several workplaces 3.1, 3.2 simultaneously increase the image quality on a trial basis, whereupon the available bandwidth is insufficient and then the bandwidth must be reduced again, which can lead to instability.

Preferably, the workplace computer 3.1, 3.2 determines whether sufficient bandwidth is available before an increase and/or after an increase of the image quality. If sufficient bandwidth is actually available, the increased image quality is retained. Camera 2.1, 2.2, 2.3 retain the corresponding values for their bandwidth-relevant parameters. Otherwise, each bandwidth-relevant parameter is reassigned the old value, i.e. the value before the increase. Preferably, for each camera 2.1, 2.2, 2.3 and for each bandwidth-relevant parameter of this camera 2.1, 2.2, 2.3, a value range is given in each case. The parameter is only changed within this value range.

Power Supply for the Workplace Computer

As already explained, in one embodiment the workplace computer 3.1, 3.2 supplies electrical power not only to the internal electrical consumers, but also to the or each camera 2.1, 2.2, 2.3 and/or the or each gas measuring device 1.1, 1.2, 1.3, 1.4. It is also possible that at least one camera 2.1, 2.2, 2.3 and/or gas measuring device 1.1, 1.2, 1.3, 1.4 comprises its own voltage supply unit.

In a preferred embodiment, the workplace computer 3.1, 3.2 can be connected to a stationary voltage supply network and comprises, for example, a corresponding cable with a corresponding plug. However, it is often not possible to supply a workplace A.1, A.2 to be monitored with electrical energy through a suitable stationary voltage supply network. In particular, it is often not possible or at least not desirable to lay long power cables.

In one embodiment, the communication unit 10 supplies the or at least one workplace computer 3.1, 3.2 with electrical power, preferably via a cable. The above-mentioned series connection between the communication unit 10 and at least two workplace computers 3.1, 3.2 also allows the power supply for the connected workplace computers 3.1, 3.2 to be implemented: The communication unit 10 has its own voltage supply unit or is connected to a stationary power supply network. The communication unit 10 supplies the first workplace computer 3.1 with electrical power, preferably via a cable. The first workplace computer 3.1 supplies electrical energy to the second workplace computer 3.2. It is also possible that the first workplace computer 3.1 permanently supplies the second workplace computer 3.2 with electrical energy, i.e. without the first workplace computer 3.1 being supplied with electrical energy by the communication unit 10. Preferably, each workplace computer 3.1, 3.2 nevertheless has its own voltage supply unit, which is used in the event that the power supply by the communication unit 10 is interrupted or not possible due to local conditions.

For the above reasons, the monitoring unit 100.1, 100.2 preferably has its own voltage supply unit which supplies at least the workplace computer 3.1, 3.2 with electrical power, optionally additionally the or a camera and/or the or a gas measuring device 1.1, 1.2, 1.3, 1.4. Preferably, this voltage supply unit comprises at least one rechargeable battery (accumulator), preferably several batteries.

A preferred embodiment of this dedicated voltage supply unit is described below.

The preferred embodiment satisfies the following limiting constraints:

In a potentially explosive environment, a device with an electrical component must not be screwed on.

A voltage supply unit should not be charged in a potentially explosive environment. In particular, a charger is often not switched off as an intrinsically safe device.

The monitoring of the workplace A.1, A.2 must not be interrupted as long as there is at least one worker there, not even to replace a voltage supply unit of the monitoring unit 100.1, 100.2.

A device with its own voltage supply unit may only be transported by air freight if the voltage supply unit has a maximum of 100 Wh of electrical charge.

According to the preferred embodiment, the voltage supply unit for the monitoring unit 100.1, 100.2 comprises an internal voltage source and at least one external voltage source, preferably two external voltage sources. The internal voltage source is arranged in that housing which also accommodates the workplace computer 3.1, 3.2. Thus, the housing protects the internal voltage source to a certain extent from external damage.

Figure 4:
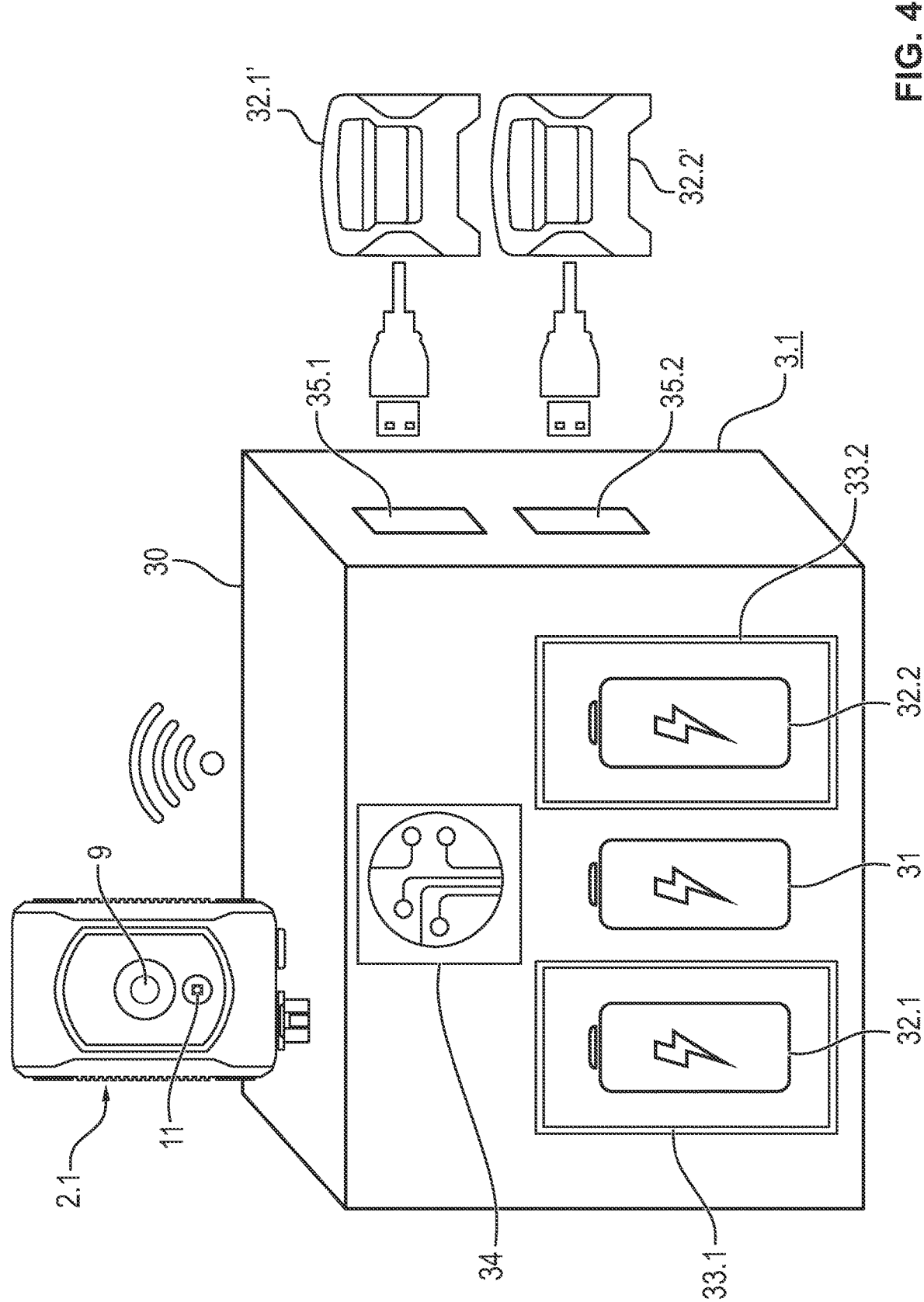
FIG. 4 is a schematic view showing a workplace computer of FIG. 1 with one internal voltage source and two external voltage sources.

FIG. 4 schematically shows the workplace computer 3.1 of the monitoring unit 100.1 for the workplace A.1. The workplace computer 3.1 comprises a housing 30, an electrical consumer in the form of a circuit board 34, an internal voltage source 31 and two external voltage sources 32.1, 32.1' and 32.2, 32.2'.

The three voltage sources 31, 32.1, 32.2 together form the voltage supply unit for the workplace computer 31, optionally for the entire monitoring unit 100.1.

In one embodiment, the workplace computer 3.1 is also capable of supplying electrical power to the camera 2.1 and the gas measuring devices 1.1, 1.2. The workplace computer 3.2 and the communication unit 10 can each comprise their own voltage supply unit, which in one embodiment is constructed in the same way as that of the workplace computer 3.1.

In the implementation shown as an example in FIG. 4, the camera 2.1 is mechanically connected to the workplace computer 3.1 in a detachable manner, preferably via a coupling point at the top of the housing 30. The lens 9 and the light source 11 of the camera 2.1 are shown as an example.

The or each external voltage source 32.1, 32.1', 32.2, 32.2' can be detachably connected to the workplace computer 3.1. The workplace computer 3.1 is capable of determining the current level of each connected external voltage source 32.1, 32.1', 32.2, 32.2' and comparing it with at least one specified lower level threshold. For example, a first level threshold is 3% or 5% and a second level threshold is 10% of the maximum level. Generally, the first level threshold is less than or equal to the second level threshold.

Preferably, the detachable electrical connection between the workplace 3.1 and the external voltage source 32.1, 32.1', 32.2, 32.2' is established in one of the following two ways:

In one embodiment, at least one coupling point for an external voltage source 32.1', 32.2' is embedded in the housing 30 of the workplace computer 3.1, preferably two coupling points for one external voltage source each. Because the workplace computer 3.1 is intrinsically safe, an external voltage source 32.1', 32.2' may be connected to the coupling point and disconnected from the coupling point again during operation, even if the workplace computer 3.1, 3.2 is located in a potentially explosive environment.

In another embodiment, a trough-shaped receptacle for an external voltage source 32.1, 32.2 is recessed in the housing 30, wherein the receptacle comprises the required electrical contact points for the voltage source and a closure can optionally release or close the receptacle. Because the workplace computer 3.1 is intrinsically safe, the lock may be opened during operation, an external voltage source 32.1, 32.2 may be removed from the receptacle, a new external voltage source 32.1, 32.2 may be inserted and the lock may be closed again.

In the example of FIG. 4, two receptacles for two external voltage sources 32.1 and 32.2 are recessed in the housing 30. An external voltage source 32.1, 32.2 can be inserted into one of these receptacles and removed from the receptacle again. The two receptacles can each be closed with a shutter 33.1, 33.2. FIG. 4 also shows two coupling points 35.1, 35.2, to each of which an external voltage source 32.1', 32.2' can be connected, for example with a suitable plug.

First, the embodiment with a single external voltage source 32.1 is described. The workplace computer 3.1 is supplied with electrical energy from the external voltage source 32.1 until the level of the external voltage source 32.1 falls below the specified first level threshold. The workplace computer 3.1—more precisely: a signal-processing control unit for the workplace computer 3.1 which is not shown—then switches the voltage supply unit when the level has fallen below the first level threshold in such a way that the workplace computer 3.1 is now supplied by the internal voltage source 31.

In addition, the workplace computer 3.1 generates a low-level message. Preferably, the workplace computer 3.1 generates this low-level message when the measured fill level has fallen below the second level threshold but is still above the first level threshold. This message is preferably transmitted to the control centers Z, T and output in the control centers Z, T or any other spatially remote receiver in a form perceptible by a human being. Preferably, this message is also output on a screen of the workplace computer 3.1. The workplace computer 3.1 later automatically detects the event that a new external power source 32.1 is connected to the workplace computer 3.1. Thereupon, the workplace computer 3.1 switches back to a supply from the connected external voltage source 32.1. For the process of replacing the used external voltage source 32.1 with a new external voltage source 32.1, the time period is available which elapses until the level of the internal voltage source 31 has also fallen below a predefined level threshold.

The embodiment with a first external voltage source 32.1 and a second external voltage source 32.2 is described in the following. As long as the workplace computer 3.1 is simultaneously connected to two external voltage sources 32.1, 32.2, it is initially supplied with electrical energy from the first external voltage source 32.1 until the level of the first external voltage source 32.1 has fallen below the specified first level threshold. Then the workplace computer 3.1 automatically switches to a supply from the second external voltage source 32.2. In addition, the workplace computer 3.1 again generates a message concerning the low level of the first external voltage source 32.1, preferably when its level has fallen below the second level threshold. The workplace computer 3.1 is supplied from the second external voltage source 32.2 until the level of the second external voltage source 32.2 has fallen below the first level threshold. As soon as the level of the second external voltage source 32.2 has fallen below the first level threshold, the system switches back to a supply from the first external voltage source 32.1—provided that the used first external voltage source 32.1 was replaced by a new external voltage source while the workplace computer 3.1 was supplied from the second external voltage source 32.2. Otherwise, the internal voltage source 31 is used.

It is possible that the workplace computer 3.1 is always supplied from an external voltage source 32.1, 32.2 until its level has fallen below the first level threshold. It is also possible that the workplace computer 3.1 is preferably supplied from the first external voltage source 32.1, namely as long as its level is above the first level threshold. The entire period during which the level of the second external voltage source 32.2 is above the first level threshold is available for replacing the first external voltage source 32.1.

At any given time, the workplace computer 3.1 is thus supplied with electrical energy from exactly one external voltage source 32.1 or 32.2, provided that the level of this external voltage source 32.1, 32.2 is above the first level threshold. The internal voltage source 31 acts as a buffer storage which supplies the workplace computer 3.1 with electrical energy if and only if no connected external voltage source 32.1, 32.2 has a level above the first level threshold.

It is possible to remove the workplace computer 3.1 from the potentially explosive environment after use and to charge or replace the internal voltage source 31 outside the potentially explosive environment.

As explained above, the communication unit 10 on the one hand forwards signals from the or each connected workplace computer 3.1, 3.2 to the control centers Z, T and conversely forwards messages from the control centers Z, T to the or each connected workplace computer 3.1, 3.2. In one embodiment, the communication unit 10 can be connected to a stationary power supply network. Preferably, the communication unit 10 also has its own voltage supply unit. Particularly preferably, this voltage supply unit for the communication unit is configured in the same way as described above with reference to FIG. 4 for the workplace computer 3.1 with the internal voltage source 31 and the two external voltage sources 32.1, 32.2.

Configuration of the Control Center as a Transportable Arrangement

Figure 5:
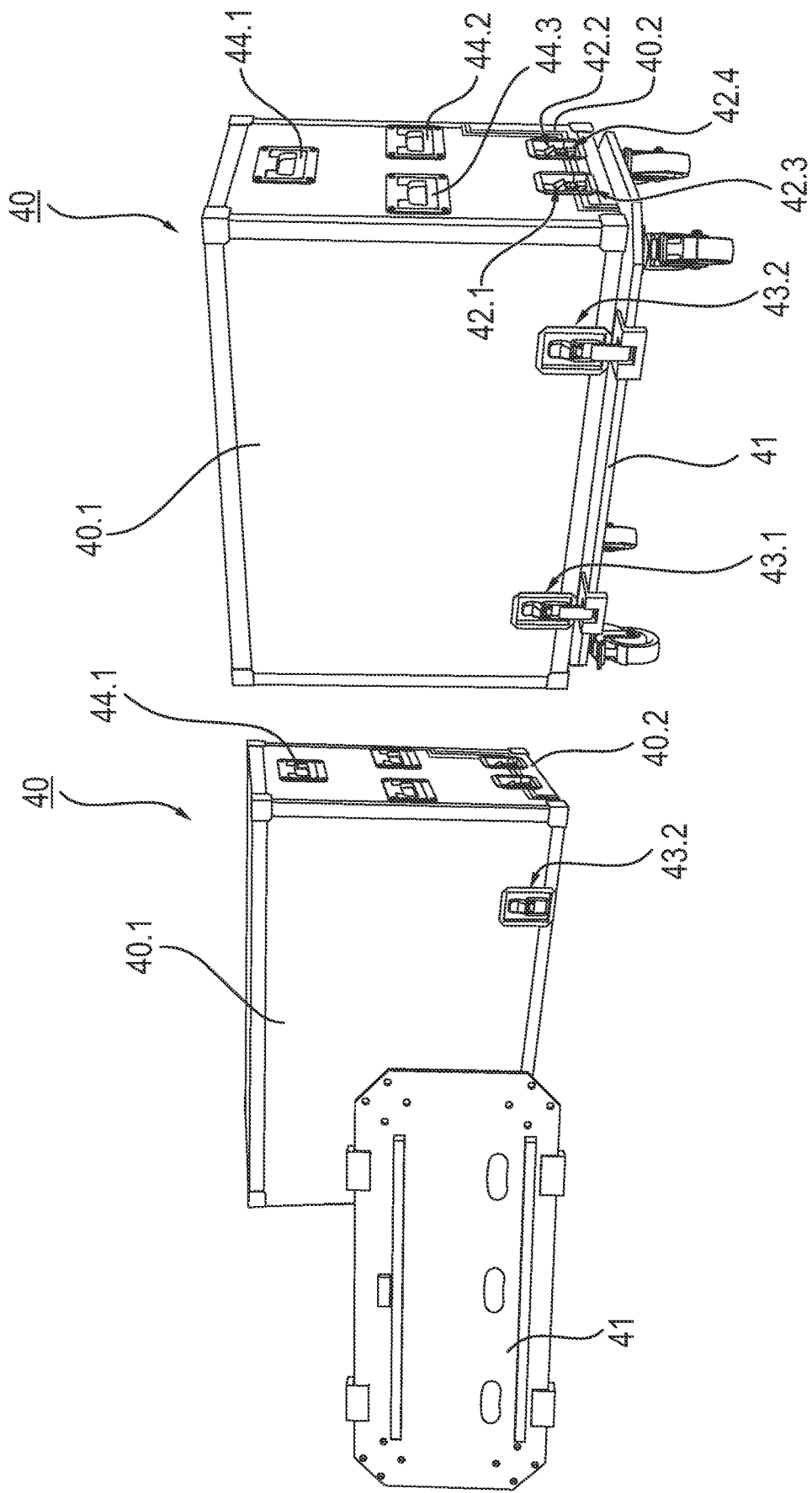
FIG. 5 is a perspective view showing a housing and a trolley for transporting the rest of the equipment of the control center.
Figure 6:
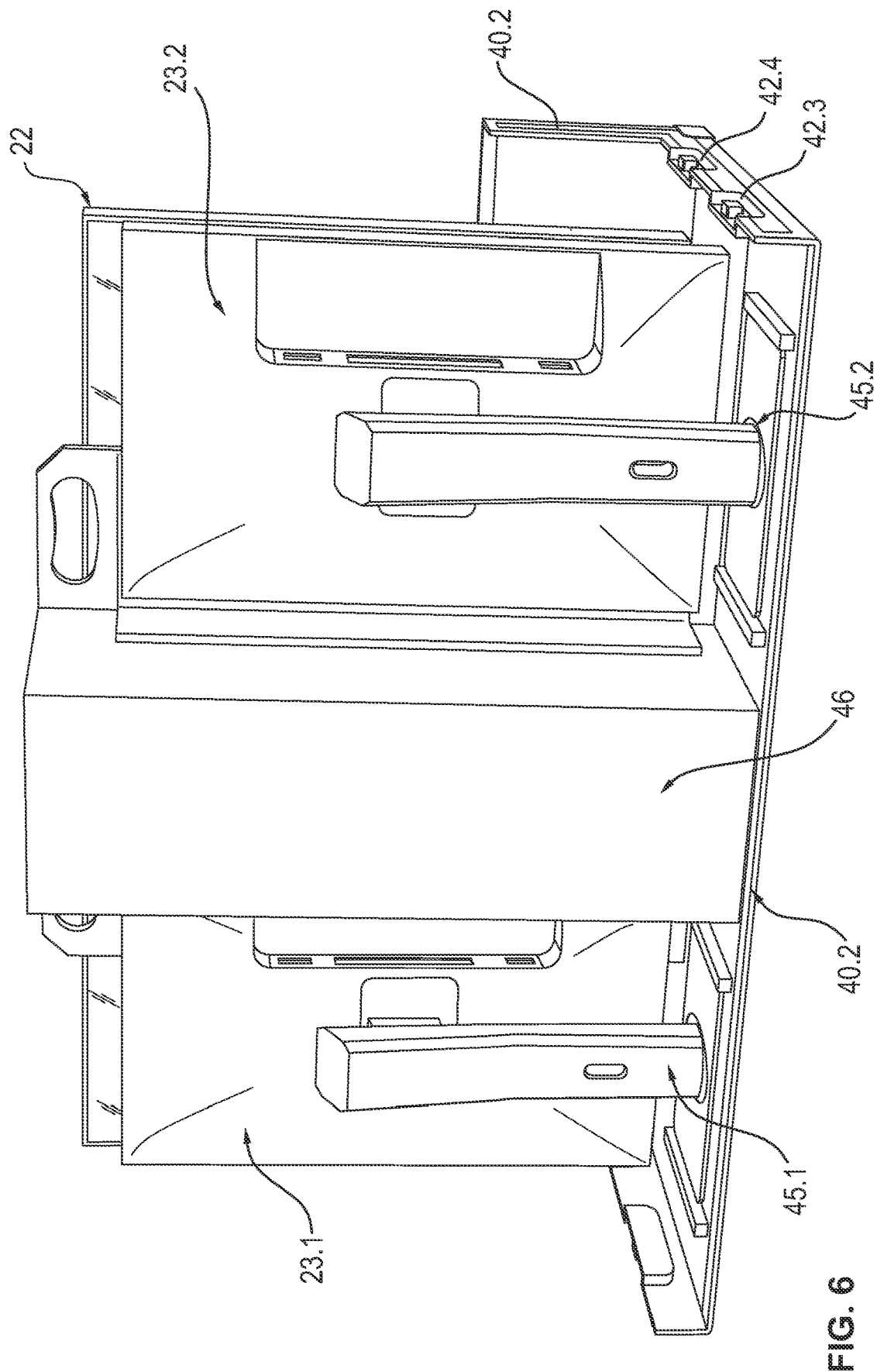
FIG. 6 is a perspective view showing the support (carrier) of the housing and several devices of the control center on this support.

FIG. 5, FIG. 6 and FIG. 7 show an example of an embodiment that makes it possible to quickly transport the devices of the first control center Z to a desired location. On the one hand, this embodiment makes it possible to establish a radio link between the communication unit 10 and the central output computer 20. On the other hand, it is facilitated to set up the first control center Z at a location where a good connection with a public mobile radio network I, 15 can be achieved.

In order to transport the devices of the first control center Z, a two-part and preferably rigid housing 40 with a detachable housing part 40.1 and a support 40.2 is used. If the two housing parts 40.1, 40.2 are mechanically connected to each other, they enclose a space which is cuboidal in the embodiment example. The detachable housing part 40.1 can be detachably connected to the support 40.2 by means of a plurality of snap locks 42.1, 42.2, . . . on the detachable housing part 40.1 and corresponding projections 42.3, 42.4 on the support 40.2. The closed housing 40 can be placed on a trolley 41 and thereby moved with relatively little effort.

By means of snap locks 43.1, 43.2, the housing 40 can be releasably connected to the trolley 41. The housing 40 preferably comprises handles 44.1, 44.2 on the detachable housing part 40.1 for transporting the housing 40. FIG. 5 shows the housing 40 with the detachable housing part 40.1 connected to the support 40.2. In FIG. 5 on the left, the trolley 41 is shown in front of the housing 40. In FIG. 5 right, the housing 40 is shown on the trolley 41.

FIG. 6 shows the three screens 22, 23.1, 23.2 on the support 40.2 after the detachable housing part 40.1 has been removed. The further screen 23.1 stands on a stand (pedestal) 45.1, the further screen 23.2 on a stand 45.2. The screen surfaces of the further screens 23.1, 23.2 face away from the viewer and towards the screen surface of the overhanging overview screen 22. A transport carrier 46 is detachably or fixedly connected to the support 40.2 and supports the further screens 23.1, 23.2 during transport.

The two additional screens 23.1, 23.2 can be lifted from the support 40.2 and positioned to the left or right of the overview screen 22. In one embodiment, the overview screen 22 is mechanically connected to the support 40.2 so that the support 40.2 also functions as a stand for the overview screen 22.

During transport, the housing 40 preferably further accommodates the central output computer 20, the headphones 21 with the microphone 27, and the communication unit 47. In one embodiment, the devices of the first control center Z are connected to each other in advance by cables and are brought onto the support 40.2 in the wired state. The detachable housing part 40.1 is placed on the support 40.2 and connected to the support 40.2 to form a housing 40 as shown in FIG. 5. The housing 40 encloses the wired devices of the first control center Z. At a location of use, the detachable housing part 40.1 is removed from the support 40.2. The two other screens 23.1, 23.2 are positioned adjacent to the overview screen 22, a connection is made to a stationary power supply network or a dedicated voltage supply unit, and the communication unit 447 is connected to the Internet and in particular to the central computer 15. In many cases, only a few minutes are required to set up the first control center Z.

Structure and Function of the Control Center

As already explained, an operator in a control center Z, T monitors the workplace A.1, A.2. The control center Z comprises a central output computer 20. The central output computer 20 and the tablet Tb can be connected to a stationary power supply network. In one embodiment, the central output computer 20 and the tablet Tb each additionally comprise or can be connected to a dedicated voltage supply unit. The dedicated voltage supply unit allows the central output computer 20 and the tablet Tb to be positioned close to the or a workplace to be monitored, even if no stationary power supply network is available there. The dedicated voltage supply unit can be configured as described above for the workplace computer 3.1 with reference to FIG. 4.

The first control center Z of the embodiment comprises an overview screen 22 and optionally at least one further screen 23.1, 23.2. Preferably, the overview screen 22 is larger than the or each further screen 23.1, 23.2. For example, the overview screen 22 has a diagonal of 43 inches, and the or each further screen 23.1, 23.2 has one of 24 inches. In one embodiment, two further screens 23.1, 23.2 are laterally and rotatably attached to the overview screen 22, similar to two wings of an altarpiece (retable) known from a church. It is also possible that the or each further screen 23.1, 23.2 is set up next to the overview screen 22, in particular with the aid of a respective stand 45.1, 45.2.

It is possible that the operator in a control center Z, T simultaneously monitors several workplaces A.1, A.2. In this embodiment, the overview screen 22 or the screen of the tablet Tb is divided into several areas 24.1, 24.2. On each area 24.1, 24.2, image signals from a respective camera 2.1, 2.2, 2.3 are displayed. The operator can select a displayed area 24.1, 24.2 and thereby a monitored workplace A.1, A.2. On a further screen 23.1, 23.2 the image signals as well as measured values and further information from the selected monitored workplace A.1 are displayed. In particular, one signal from each gas measuring device 1.1, 1.2 installed at the workplace A.1 is displayed there.

In one embodiment, the operator may control the or each camera 2.1, 2.2, 2.3 at a monitored workplace A.1, A.2 from the control center Z, T. In particular, the operator may cause one of the following changes to be performed on the camera 2.1, 2.2, 2.3:

- An optional actuator swivels and/or shifts the camera 2.1, 2.2, 2.3 and changes in particular the viewing direction and/or the viewing angle and/or the imaging scale of the camera 2.1, 2.2, 2.3.
- The focal length and thus the magnification of the camera 2.1, 2.2, 2.3 are changed. The camera 2.1, 2.2, 2.3 thus zooms into or out of the workplace.
- An optional light source of the camera 2.1, 2.2, 2.3 is switched on or off.
- The camera 2.1, 2.2, 2.3 is switched on or off.
- The resolution and/or the frame rate with which the photosensor of the camera 2.1, 2.2, 2.3 generates images is changed. This changes the bandwidth required to transmit the image signal of the camera 2.1, 2.2, 2.3.
- A bandwidth-relevant parameter of an algorithm is changed, which the image processing unit of the camera 2.1, 2.2, 2.3 applies to process the images of the photosensor and to generate the image signal of the camera 2.1, 2.2, 2.3 by the processing program 18 to form the presentation data 17.

The operator is informed visually and/or acoustically that one of several possible alarm situations has occurred. Or the operator detects an alarm situation himself or herself. Examples of alarm situations are:

- A gas measuring device 1.1, 1.2, 1.3, 1.4 has detected a target gas concentration above a specified concentration threshold.
- The optional image evaluation unit has automatically detected a hazardous situation at the monitored workplace A.1, A.2, for example a fire or a very rapid movement. Such a movement can be caused by a falling object or a fall of a worker.
- A workplace computer 3.1, 3.2 for a monitored workplace A.1, A.2 has detected that it is not receiving an image signal from a camera and/or a signal from a gas measuring device 1.1, 1.2, 1.3, 1.4 and/or from a voice input unit 4.1, 4.2 and/or from an access control unit 6.1, 6.2.
- The communication unit 10 has detected that it is not receiving a signal from a workplace computer 3.1, 3.2.
- The operator has discovered that a screen 22, 23.1, 23.2 in the control center Z, T shows a dangerous situation at a monitored workplace A.1, A.2, for example, an accident or a fire.
- The data connection between a monitoring unit 100.1, 100.2 and a control center Z, T is interrupted.
- A worker has signaled that an alarm is to be triggered at workplace A.1, A.2.
- The operator has discovered that a worker at workplace A.1, A.2 is not wearing the prescribed protective equipment and/or has not registered with the access control unit 6.1, 6.2. The first event can often be detected in images from at least one camera 2.1, 2.2, 2.3. The second event can lead to the fact that in an image of the workplace A.1, A.2 more persons can be seen than are currently in or at the workplace A.1, A.2 according to the access control unit 6.1, 6.2.

As shown above, in one embodiment, the overview screen 22 is divided into a plurality of areas 24.1, 24.1, with image signals from a camera 2.1, 2.3 being displayed on each area 24.1, 24.1, respectively. If a gas measuring device 1.1, 1.2, 1.3, 1.4 detects an alarm at a workplace A.1, A.2, each area on the overview screen 22 on which an image signal from this workplace A.1, A.2 is displayed is highlighted. Thus, the alarm is visually output. For example, a frame 27.1, 27.2 is displayed differently around the area 24.1, 24.2. In addition, an alarm is preferably output acoustically, for example by an acoustic signal on the operator's headphones 21.

FIG. 3 shows a schematic example of how an alarm situation is presented to the operator in the Z control center:

- The frame 27.1 around window 24.1 is highlighted. This indicates that an alarm situation has occurred at workplace A.1.
- An acoustic message is output on the headset 21.
- On the further screen 23.1 two windows 25 and 26 are shown.
- In window 26, measured target gas concentrations con.1, con.2, which the two gas measuring devices 1.1 and 1.2 measured at workplace A.1, are shown. The target gas concentration con.1 is highlighted. This indicates in a visually perceptible way that this value is above a concentration threshold and therefore dangerously high. Based on this measurement, the gas measuring device 1.1 has triggered the alarm for workplace A.1.

The operator selects the or each workplace A.1 that is affected by the alarm situation. For example, a harmful gas has leaked, or a fire has broken out at a workplace A.1. Then workplaces above and/or next to it are also affected.

The operator effects for the or each selected workplace A.1 the step that an alarm is triggered at this workplace A.1. Triggering an alarm causes the following actions, either automatically or after a corresponding confirmation by the operator:

- The alarm element issues an alarm visually and acoustically. A required consequence is that workplace A.1 is evacuated.
- The access control unit 6.1 notifies a worker who wants to log in that the workplace A.1 is locked and may not be entered.
- A message comprising the alarm is transmitted to at least one other communication unit, for example, to a communication unit of a plant fire department or an ambulance station.

In the event of an alarm, a notification window is also opened on one screen, preferably on another screen 23.1, 23.2. The operator can cause the actions with which he or she reacts to the alarm by making entries in this notification window. The notification window shows possible actions to be taken by the operator in response to an alarm in many cases, but not in every case. Examples are:

Workplace A.1 is locked as just described above.

A paramedic is notified and told to go to the work site.

FIG. 3 illustrates this by way of example: A list is shown in window 25. This list shows measures to be taken after the occurrence of an alarm at workplace A.1. Three measures A, B, C are shown as an example. Next to each measure of the list in window 25 an input field is shown. In one implementation, the operator makes an entry in an input field next to a measure A, B, C, thereby triggering that measure A, B, C. In another implementation, the operator triggers the action A, B, C and then confirms that he or she has triggered this action A, B, C by making an entry in the input window. In both implementations, it is the operator's responsibility which actions he or she actually triggers. The list in window 25 reduces the risk that the operator does not trigger a required action A, B, C. On the other hand, a corresponding action A, B, C is only triggered after the operator has released it.

The operator in a control center Z, T is also informed of events that also require a response, but do not require work at a workplace A.1, A.2 to be interrupted immediately. Examples of such events are:

In order to transmit image signals from the workplace A.1, A.2 to a control center Z, T, only little bandwidth is available. One possible reaction, namely a down-regulation of the or a camera 2.1, 2.2, 2.3 at this workplace A.1, A.2, has already been described above. As already explained, this reaction is triggered automatically. The operator can also trigger this action.

The fill level of an external voltage source 32.1, 32.2 for a device of a monitoring unit 100.1, 100.2 has fallen below the specified second level threshold. The voltage source 32.1, 32.2 must be replaced.

Preferably, it is ensured that the operator actually monitors each workplace A.1, A.2. Of course, it can never be ruled out that an operator suffers a fainting spell or an accident and therefore can no longer perform the monitoring. Preferably, therefore, the central output computer 20 and the tablet Tb check how much time has elapsed since the last user input at the control center Z, T. If the elapsed time is greater than a specified first time duration threshold, the central output computer 20 and the tablet Tb preferably cause a request to be issued to the operator to now perform a user input. If no user input is detected after a further time period of a specified duration has elapsed, the central output computer 20 and the tablet Tb each generate a corresponding alert message and cause that alert message to be transmitted to a spatially remote receiver. This receiver is, for example, a computer of another operator ("field operator"). In one embodiment, a data connection can be established between this computer, which acts as the receiver of the alarm message, and the central computer 15, so that the further operator can also monitor the or each workplace A.1, A.2 remotely. In addition, the central output computer 20 preferably causes an alarm to be output at each workplace A.1, A.2.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 1.1, 1.2 | Gas measuring device in workplace A.1 |
| 1.2 | Gas measuring device, attached to the outside of the workplace A.1, connected to the hose 8 |
| 1.3 | Gas measuring device in workplace A.2 |
| 1.4 | Gas measuring device in front of inlet E.2 to workplace A.2 |
| 2.1 | Camera in workplace A.1 |
| 2.2, 2.3 | Cameras in the workplace A.2 |
| 3.1 | Workplace of the monitoring unit 100.1, carries the camera 2.1 |
| 3.2 | Workplace computer of the monitoring unit 100.2 |
| 4.1 | Speech input unit in the workplace A.1 |
| 4.2 | Speech input unit in the workplace A.2 |
| 5.1 | Speech output unit in the workplace A.1 |
| 5.2 | Speech output unit in the workplace A.2 |
| 6.1 | Access control unit in the workplace A.1 |
| 6.2 | Access control unit in the workplace A.2 |
| 7.1 | Alarm input element in workplace A.1 |
| 7.2 | Alarm input element in workplace A.2 |
| 8 | Hose through which the gas measuring device 1.2 can suck in a gas sample from the workplace A.1 |
| 9 | Camera lens 2.1 |
| 10 | Communication unit (router), which establishes a connection between the workplace computers 3.1 and 3.2 on the one hand and the control centers Z, T on the other hand |
| 11 | Camera light source 2.1 |
| 13.1, 13.2 | Temperature sensor at the workplace A.1, A.2 |
| 15 | Central computer, comprises the monitoring system area 16, is in a respective bidirectional data connection with the communication unit 10 and the control centers Z, T via the mobile radio network. |
| 16 | Monitoring system area on the central computer 15, is used for the monitoring system |
| 17 | Prepared data (presentation data) of the signals from the monitoring units 100.1, 100.2, is generated by the processing program 18 |
| 18 | Processing program, which belongs to the monitoring system area 16, preferably realized as a web server |
| 20 | Central output computer of the first control center Z, connected to each workplace computer 3.1, 3.2 via the communication unit 10, capable of controlling the screens 22, 23.1 and 23.2 and the headphones 21 and receiving a voice input from the microphone 27, capable of receiving data from the central computer 15 |

| | |
|---|---|
| 21 | Headphones in the control centers Z, T |
| 22 | Overview screen of the first control center Z, displays one image signal from each camera 2.1, 2.2, 2.3 |
| 23.1 | A further screen of the first control center Z, hingedly connected to the overview screen 22, displays in window 25 the measures to be taken after an alarm and in window 26 the measured target gas concentrations con.1, con.2 |
| 23.2 | A further screen of the first control center Z, hinged to the overview screen 22, displays windows 25 and 26 |
| 24.1 | Window for display A.1' of the image signal from the camera 2.1 on the overview screen 22 22 and the screen 28, shows the monitored workplace A.1 |
| 24.2 | Window for displaying A.2' of the image signal from camera 2.2 on overview screen 22 and screen 28, shows the monitored workplace A.2 |
| 25 | Window on the further screen 23.1 list the measures A, B, C to be taken after the alarm at the workplace A.1 |
| 26 | Window on the further screen 23.1, in which the target gas concentrations con.1, con.2 measured at the workplace A.1 are displayed |
| 27 | Microphone in the control centers Z, T, connected to the headphones 21 |
| 28 | Tablet screen Tb |
| 30 | Housing of the workplace computer 3.1 |
| 31 | Internal voltage source of the workplace computer 3.1 |
| 32.1 | First external voltage source, can be detachably inserted into a trough-shaped receptacle and thus connected to the workplace 3.1 |
| 32.1' | First external voltage source, can be detachably connected to a coupling point 35.1, 35.2 |
| 32.2 | Second external voltage source, can be detachably inserted into a trough-shaped receptacle and thus connected to the workplace computer 3.1 |
| 32.2' | Second external voltage source, can be detachably connected to a coupling point 35.1, 35.2 |
| 33.1, 33.2 | Closure for a receptacle in which an external voltage source 32.1, 32.2 can be inserted and removed again |
| 34 | Circuit board of the workplace computer 3.1 |
| 35.1, 35.2 | Coupling points in housing 30 for one external voltage source each 32.1', 32.2' |
| 40 | Housing for the devices of the first control center Z, comprises a detachable housing part 40.1 and a support 40.2, can be placed on the trolley 41 |
| 40.1 | Detachable housing part of the housing 40, can be detachably connected to the support 40.2, has the projections 42.3, 42.4, the snap locks 43.1, 43.2, the handles 44.1, 44.2, 44.3 |
| 40.2 | Support of the housing 40, preferably functions as a stand for the overview screen 22 |
| 41 | Trolley for transporting the housing 40 |
| 42.1, 42.2 | Snap fasteners on the detachable housing part 40.1 for detachable connection of the detachable housing part 40.1 to the support 40.2 |
| 42.3, 42.4 | Projections on the support 40.2 for detachably connecting the detachable housing part 40.1 to the support 40.2 |
| 43.1, 43.2 | Snap locks for detachably connecting the housing 40 to the trolley 41 |
| 44.1, 44.2 | Handles on detachable housing part 40.1 |
| 45.1, 45.2 | Stand for the further screen 23.1, 23.2 |
| 46 | Transport carrier for screens 22, 23.1, 23.2 |
| 47 | Communication unit (router) of the control center Z |
| 48 | Output program on the central output computer 20 |
| 49 | Output program on the tablet TB |
| 50 | Mouse of the central workplace computer 20 |
| 100.1 | Workplace monitoring unit A.1, includes gas measuring devices 1.1 and 1.2, camera 2.1, workplace computer 3.1, voice input unit 4.1, voice output unit 5.1, alarm input element 7.1, and hose 8 |
| 100.2 | Workplace monitoring unit A.2, includes gas measuring devices 1.3 and 1.4, cameras 2.2 and 2.3, workplace computer 3.2, voice input unit 4.2, voice output unit 5.2, and alarm input element 7.2 |
| A.1 | Workplace monitored by means of the monitoring unit 100.1 includes the input E.1 |
| A.1' | Display from workplace A.1 on an output unit 22, 28 of the control center Z, T |
| A.2 | Workplace monitored by means of the monitoring unit 100.2 includes input E.2 |
| A.2' | Display from workplace A.2 on an output unit 22, 28 of the control center Z, T |
| con.1, con.2 | Target gas concentrations at the workplace A.1, measured by the gas measuring device 1.1, displayed on the further screen 23.1 |
| E.1, E.2 | Entrance to the workplace A.1, A.2 |
| I | Internet through which the communication unit 10 is connected to the control centers and T |
| T | Further (second) control center, realized on the tablet Tb, includes the screen 28, the headphone 21 and the microphone 27 |

| | |
|---|---|
| Tb | Tablet of the further control center T, includes the screen 28 |
| Z | First control center, includes central output computer 20, headset 21, mouse 50, overview screen 22, other screens 23.1, 23.2, microphone 27, and communication unit 47 |

What is claimed is:

1. A monitoring system for workplace monitoring, the monitoring system comprising:
a monitoring unit configured to monitor a workplace, the monitoring unit comprising: a camera configured to generate an image signal from the monitored workplace; a gas measuring device configured to measure a concentration of a target gas at the monitored workplace; and a workplace computer, wherein at least one of the gas measuring device and the workplace computer is configured to compare a measured target gas concentration with a specified range of concentration values, and to generate an alarm if the measured target gas concentration is outside the specified range;
a communication unit;
a control center that is physically remote from the communication unit and from the monitoring unit, the control center comprising a central output computer and an output unit;
a camera communication connection configured to provide a wired or a wireless data connection between the camera and the workplace computer;
a gas measuring device communication connection configured to provide a wired or a wireless data connection between the gas measuring device and the workplace computer;
a workplace computer communication connection configured to provide a wired or a wireless data connection between the workplace computer and the communication unit;
a communication unit communication connection configured to provide a data connection between the communication unit and the central output computer, the data connection between the communication unit and the central output computer comprising a wireless data connection,
wherein the monitoring system is configured to transmit the image signal and every alarm to the central output computer via the workplace computer and the communication unit,
wherein the central output computer is configured to control the output unit such that the controlled output unit outputs a representation for the monitored workplace,
wherein the representation for the monitored workplace comprises every alarm, in a form perceptible by a human being, and the image signal,
wherein the communication unit communication connection is at least partially routed via a public mobile radio network,
wherein the public mobile radio network uses a central computer with an area of the central computer configured for a data connection with the communication unit and for a data connection with the central output computer,
wherein the area of the central computer comprises a processing program which is executable on the central computer,
wherein an output program is installed on the central output computer,
wherein the processing program is configured to generate presentation data upon execution of the processing program,
wherein the presentation data comprises every alarm and the image signal representable in a form perceptible by a human being, and
wherein the central output computer is configured to control the output unit using the output program such that the representation, which the controlled output unit outputs, represents the presentation data generated by the processing program.

2. A monitoring system according to claim 1, wherein the monitoring unit is a first monitoring unit for monitoring the workplace as a first monitored workplace and the monitoring system further comprises:
a second monitoring unit for monitoring a second workplace as a second monitored workplace, the second monitoring unit comprising: a second camera; a second gas measuring device, and a second workplace computer; and
a second workplace computer communication connection configured to provide a wired or a wireless data connection between the second workplace computer and the communication unit.

3. A monitoring system according to claim 1, wherein the control center is a first control center, the monitoring system further comprising a second control center that is physically remote from the first control center, the communication unit, and the monitoring unit, the second control center comprising a second central output computer and a second output unit, wherein:
the area of the central computer is further configured for a data connection with the second central output computer;
a second output program is installed on the second central output computer,
the second central output computer is configured to control the second output unit using the presentation data generated by the processing program and using the second output program such that a representation, which the second output unit outputs, represents the presentation data generated by the processing program.

4. A monitoring system according to claim 1, wherein:
a transmission of the image signal from the camera to the central output computer requires a bandwidth;
the camera has a bandwidth-relevant parameter with a parameter value that affects the bandwidth required for the transmission of the image signal to the central output computer; and
the monitoring system is configured to control the camera with a control objective that the parameter value is changed such that the bandwidth required for transmitting the image signal is changed.

5. A monitoring system according to claim 4, wherein the monitoring system is configured:
- to determine an indicator of bandwidth currently available for a data transmission from the communication unit to the central output computer; and
- depending on the determined available bandwidth, to control the camera with a control objective of changing the parameter value.

6. A monitoring system according to claim 5, wherein the workplace computer of the monitoring unit is adapted:
- to determine the indicator of the currently available bandwidth; and
- depending on the determined bandwidth, to control the camera of the monitoring unit with the control objective to change the parameter value.

7. A monitoring system according to claim 4, wherein:
- the monitoring unit comprises an access control unit for the monitored workplace;
- the monitoring system is configured to determine, using signals from the access control unit, a number of persons that currently stay in or at the workplace;
- the monitoring system is configured to control the camera of the monitored workplace depending on the determined number of persons currently staying in or at the workplace;
- a control objective of the control is to change the value of the bandwidth-relevant parameter of the controlled camera such that the smaller the determined number of persons is, the smaller is the required bandwidth; and
- the controlled camera transmits an image signal even if the access control unit has not detected a person in or at the workplace.

8. A monitoring system according to claim 1, wherein the monitoring system is configured to transmit both an alarm and a message containing a target gas concentration resulting in the alarm to the control center when the monitoring unit has generated the alarm.

9. A monitoring system according to claim 1, wherein:
- the output unit comprises a screen;
- the central output computer is configured to control the output unit such that the controlled output unit outputs the representation for the monitored workplace in an area of the screen, the representation output in the screen area includes the image signal and a visually perceptible indication as to whether or not at least one of the gas measuring device and the workplace computer has generated an alarm.

10. A monitoring system according to claim 1, further comprising a housing defining an enclosed space, the housing is configured to accommodate in the enclosed space at least the central output computer and the output unit of the control center.

11. A monitoring system according to claim 10, wherein:
- the housing comprises a detachable housing part and a support;
- the detachable housing part is configured to be detachably connected to the support;
- the detachable housing part and the support, when connected together, provide the enclosed space; and
- the support is connected to an output unit component of the output unit and provides a stand for the output unit component.

12. A monitoring system according to claim 1, wherein:
- the output unit of the control center comprises an overview screen and a further display screen;
- the central output computer is configured to control the overview screen such that the controlled overview screen outputs the representation for the monitored workplace in an area of the overview screen, the area being assigned to the monitored workplace; and
- the central output computer is further configured to control the further display screen such that after a selection of the monitored workplace or after receipt of the alarm from the monitored workplace, the controlled further display screen outputs the target gas concentration measured by the gas measuring device.

13. A monitoring system according to claim 1, wherein:
- the central output computer is configured to control the output unit such that after receiving an alarm from the gas measuring device, the controlled output unit outputs an output list in a form perceptible by a human being; and
- the output list specifies the monitored workplace and specifies at least one action to be performed as a result of the alarm at the monitored workplace.

14. A monitoring system according to claim 13, wherein the output unit comprises an overview screen and a further screen;
- the central output computer is configured to control the overview screen such that the controlled overview screen outputs the representation for the monitored workplace in an area of the overview screen, the area being assigned to the monitored workplace;
- the central output computer is further configured to, in a state with receipt of an alarm, control the overview screen such that the controlled overview screen outputs in the area of the overview screen the representation for the monitored workplace differently than the representation for the monitored workplace in a state with no receipt of an alarm; and
- the central output computer is further configured to control the further screen such that the controlled further screen outputs the list.

15. A monitoring system for workplace monitoring, the monitoring system comprising:
- a monitoring unit configured to monitor a workplace, the monitoring unit comprising: a camera configured to generate an image signal from a monitored workplace; a gas measuring device configured to measure a concentration of a target gas at the monitored workplace; and a workplace computer, wherein at least one of the gas measuring device and the workplace computer is configured to compare a measured target gas concentration with a specified range of concentration values, and to generate an alarm if the measured target gas concentration is outside the specified range;
- a communication unit;
- a control center that is physically remote from the communication unit and from the monitoring unit, the control center comprising a central output computer and an output unit;
- a camera communication connection configured to provide a wired or a wireless data connection between the camera and the workplace computer;
- a gas measuring device communication connection configured to provide a wired or a wireless data connection between the gas measuring device and the workplace computer;
- a workplace computer communication connection configured to provide a wired or a wireless data connection between the workplace computer and the communication unit; and
- a communication unit communication connection configured to provide a data connection between the communication unit and the central output computer, the data connection between the communication unit and the central output computer comprising a wireless data connection, wherein:

the monitoring system is configured to transmit the image signal and every alarm to the central output computer via the workplace computer and the communication unit;

the central output computer is configured to control the output unit such that the controlled output unit outputs a representation for the monitored workplace;

the representation for the monitored workplace comprises every alarm, in a form perceptible by a human being, and the image signal;

the workplace computer comprises a housing and an own voltage supply unit;

the workplace computer comprises an electrical consumer and/or is connected or configured to be electrically connected or connectable to an electrical consumer;

the electrical consumer comprises at least one of the camera and the gas measuring device;

the voltage supply unit comprises an internal voltage source and an external voltage source;

the internal voltage source is located inside the housing;

the external voltage source is configured to be detachably connected to the workplace computer;

the workplace computer is configured to supply the electrical consumer with electrical energy from the connected external voltage source for as long as a fill level of the external voltage source is above a specified first level threshold, and to generate a message when the fill level is below the first level threshold or below a specified second level threshold; and the second level threshold is equal to or greater than the first level threshold.

16. A monitoring system according to claim 15, wherein:

the external voltage source is a first external voltage source, and the voltage supply unit further comprises a second external voltage source configured to be detachably connected to the workplace computer;

the workplace computer is configured, with both external voltage sources connected to the workplace computer at the same time, to:

supply the electrical consumer with electrical energy from the first external voltage source until the fill level of the first external voltage source is below the specified first level threshold; and subsequently supply the electrical consumer from the second external voltage source.

17. A monitoring system according to claim 15, wherein the workplace computer is configured, with the fill level of the external voltage source below the first level threshold, to supply the electrical consumer from the internal voltage source.

18. A monitoring system according to claim 1, wherein the monitoring unit is a first monitoring unit for monitoring the workplace as a first monitored workplace;

the workplace computer of the first monitoring unit is a first workplace computer;

the monitoring system further comprises a second monitoring unit for monitoring a second workplace as a second monitored workplace;

the second monitoring unit comprises a second workplace computer; and the two workplace computers and the communication unit are configured to be connected in series such that the first workplace computer is connected to the communication unit by a first data connection and the second workplace computer is connected to the first workplace computer by a second data connection.

19. A monitoring system according to claim 1, wherein the central output computer is configured:

to determine if a message has arrived at the central output computer from the workplace computer within a specified time period, wherein the message is at least one of an alarm, the image signal, and a message generated by the workplace computer; and if no message has been received from the workplace computer at the end of the specified time period, to generate an alarm and output the alarm on the output unit in a form perceptible by a human, wherein the alarm identifies the monitored workplace.

20. A monitoring system according to claim 19, wherein:

the central output computer is configured to generate a request message for the workplace computer at the beginning of the specified time period, and to cause the request message to be transmitted to the workplace computer;

the monitoring system is configured to transmit the request message to the workplace computer; and the workplace computer is configured to generate a response message in response to the receipt of a request message, and to cause the response message to be transmitted to the central output computer.

21. A monitoring system according to claim 1, wherein:

the workplace computer is configured to determine whether a message from the central output computer has arrived at this workplace computer within a specified time period, and if no message has arrived at the workplace computer within the specified time period, the workplace computer is configured to generate a warning and issue this warning at the monitored workplace in a form that can be perceived by a human.

22. A monitoring system according to claim 21, wherein the central output computer is configured to generate a request message for the workplace computer within the time period, and to cause the request message to be transmitted to the workplace computer.

23. A monitoring process for workplace monitoring, the process comprising:

providing a monitoring system comprising:

a monitoring unit for monitoring a workplace, the monitoring unit comprising a camera, a gas measuring device; and a workplace computer;

a communication unit; and a control center that is physically remote from the communication unit and from the monitoring unit, the control center comprising a central output computer and an output unit;

monitoring the workplace, the monitoring comprising the steps of with the camera, generating an image signal and with the gas measuring device, measuring an indicator of a concentration of a target gas at the monitored workplace;

with at least one of the gas measuring device and the workplace computer, comparing the measured target gas concentration with a specified range of concentration values and if the measured target gas concentration is outside of the specified range, generating an alarm;

transmitting the image signal and every alarm from the monitored workplace via the workplace computer and the communication unit to the central output computer;

with the central output computer, controlling the output unit such that the controlled output unit outputs a representation for the monitored workplace, wherein the representation for the monitored workplace comprises, in a form perceptible by a human, every alarm and the image signal, wherein the image signal and every alarm are transmitted by means of a wired or wireless data connection to the workplace computer, and wherein the image signal and every alarm are transmitted from the workplace computer to the communication unit by means of a wired or wireless data connection, wherein the image signal and every alarm are transmitted from the communication unit to the central output computer, wherein the transmission from the communication unit to the central output computer comprises a wireless data transmission, wherein the communication unit communication connection is at least partially routed via a public mobile radio network, wherein the public mobile radio network uses a central computer with an area of the central computer configured for a data connection with the communication unit and a data connection with the central output computer, wherein the area of the central computer comprises a processing program which is executable on the central computer, wherein an output program is installed on the central output computer, with the processing program, generating presentation data upon execution of the processing program, wherein the presentation data comprises every alarm and the image signal representable in a form perceptible by a human being, and with the central output computer, controlling the output unit using the output program such that the representation which the controlled output unit outputs represents the presentation data generated by the processing program.

24. A monitoring process according to claim 23, wherein the camera has a bandwidth-relevant parameter that has a parameter value that affects the bandwidth required to transmit the image signal from the camera to the central output computer, the process further comprising the steps of:
determining an indicator of a bandwidth currently available for data transmission from the communication unit to the central output computer; and
if determining that the indicator is too low, controlling the camera with the control objective to change the parameter value to reduce the bandwidth required to transmit the image signal to the central output computer.

25. A monitoring process according to claim 24, wherein the process comprises the further steps of:
controlling the camera with the objective of changing the parameter value to increase on a trial basis an image quality of the image signal;
determining whether sufficient bandwidth to transmit the image signal with the increased image quality to the central output computer is available;
if sufficient bandwidth is available, retaining the changed parameter value; and
if sufficient bandwidth is not available, controlling the camera with the objective to change the parameter value or change another parameter value to reduce the required bandwidth again by the change.

26. A monitoring system for workplace monitoring, the monitoring system comprising:
a monitoring unit configured to monitor a workplace, the monitoring unit comprising: a camera configured to generate an image signal from the monitored workplace; a gas measuring device configured to measure a concentration of a target gas at the monitored workplace; and a workplace computer, wherein at least one of the gas measuring device and the workplace computer is configured to compare a measured target gas concentration with a specified range of concentration values, and to generate an alarm if the measured target gas concentration is outside the specified range;
a communication unit;
a control center that is physically remote from the communication unit and from the monitoring unit, the control center comprising a central output computer and an output unit;
a camera communication connection configured to provide a wired or a wireless data connection between the camera and the workplace computer;
a gas measuring device communication connection configured to provide a wired or a wireless data connection between the gas measuring device and the workplace computer;
a workplace computer communication connection configured to provide a wired or a wireless data connection between the workplace computer and the communication unit;
a communication unit communication connection configured to provide a data connection between the communication unit and the central output computer, the data connection between the communication unit and the central output computer comprising a wireless data connection,
wherein the monitoring system is configured to transmit the image signal and every alarm to the central output computer via the workplace computer and the communication unit,
wherein the central output computer is configured to control the output unit such that the controlled output unit outputs a representation for the monitored workplace,
wherein the representation for the monitored workplace comprises every alarm, in a form perceptible by a human being, and the image signal,
wherein a transmission of the image signal from the camera to the central output computer requires a bandwidth,
wherein the camera has a bandwidth-relevant parameter with a parameter value that affects the bandwidth required for the transmission of the image signal to the central output computer,
wherein the monitoring system is configured to control the camera with a control objective that the parameter value is changed such that the bandwidth required for transmitting the image signal is changed,
wherein the monitoring unit comprises an access control unit for the monitored workplace,
wherein the monitoring system is configured to determine, using signals from the access control unit, a number of persons that currently stay in or at the workplace,
wherein the monitoring system is configured to control the camera of the monitored workplace depending on the determined number of persons currently staying in or at the workplace, wherein a control objective of the control is to change the value of the bandwidth-relevant parameter of the controlled camera such that the smaller the determined number of persons is, the smaller is the required bandwidth, and wherein the controlled camera transmits an image signal even if the access control unit has not detected a person in or at the workplace.

* * * * *